(12) United States Patent
Love et al.

(10) Patent No.: US 9,836,183 B1
(45) Date of Patent: Dec. 5, 2017

(54) SUMMARIZED NETWORK GRAPH FOR SEMANTIC SIMILARITY GRAPHS OF LARGE CORPORA

(71) Applicant: Quid, Inc., San Francisco, CA (US)

(72) Inventors: Oriana Jeannette Love, Alameda, CA (US); Mary Kate Lowe, San Francisco, CA (US); Ruggero Altair Tacchi, San Francisco, CA (US); Alex Marrs, San Francisco, CA (US)

(73) Assignee: Quid, Inc., San Francisco, CA (US)

( * ) Notice: Subject to any disclaimer, the term of this patent is extended or adjusted under 35 U.S.C. 154(b) by 0 days.

(21) Appl. No.: 15/264,975

(22) Filed: Sep. 14, 2016

(51) Int. Cl.
G06F 3/00 (2006.01)
G06F 3/0481 (2013.01)
G06F 3/0486 (2013.01)
G06T 11/20 (2006.01)
G06F 17/30 (2006.01)

(52) U.S. Cl.
CPC ........ *G06F 3/04817* (2013.01); *G06F 3/0486* (2013.01); *G06F 17/30958* (2013.01); *G06F 17/30994* (2013.01); *G06T 11/206* (2013.01); *G06F 3/0481* (2013.01)

(58) Field of Classification Search
CPC ........................................ G06F 3/0481–3/0489
See application file for complete search history.

(56) References Cited

U.S. PATENT DOCUMENTS 5,592,600 A * 1/1997 De Pauw .............. G06F 11/323 345/440
5,596,703 A * 1/1997 Eick .................... H04M 3/2254 345/440
5,790,121 A * 8/1998 Sklar ................. G06F 17/30572 715/835
5,870,559 A * 2/1999 Leshem .................. G06F 11/32 707/E17.116
5,889,523 A * 3/1999 Wilcox ............... G06F 3/04842 715/205

(Continued)

OTHER PUBLICATIONS

Lin et. al. "Discovering and explaining abnormal noded in semantic graphs" May 2006.*

(Continued)

*Primary Examiner* — Steven B Theriault
(74) *Attorney, Agent, or Firm* — Pillsbury Winthrop Shaw Pittman LLP

(57) ABSTRACT

Provided is a process including: obtaining a clustered graph, the clustered graph having three or more clusters, each cluster having a plurality of nodes of the graph, the nodes being connected in pairs by one or more respective edges; determining visual attributes of cluster icons based on amounts of nodes in clusters corresponding to the respective cluster icons; determining positions of the cluster icons in a graphical visualization of the clustered graph; obtaining, for each cluster, a respective subset of nodes in the respective cluster; determining visual attributes of node icons based on attributes of corresponding nodes in the subsets of nodes, each node icon representing one of the nodes in the respective subset of nodes; determining positions of the node icons in the graphical visualization based on the positions of the corresponding cluster icons of clusters having the nodes corresponding to the respective node icons; and causing the graphical visualization to be displayed.

27 Claims, 7 Drawing Sheets

(56) References Cited

U.S. PATENT DOCUMENTS

| | | | | |
|---|---|---|---|---|
| 5,958,008 A * | 9/1999 | Pogrebisky | G06F 11/32 | 707/E17.116 |
| 6,025,843 A * | 2/2000 | Sklar | G06F 17/30241 | 715/841 |
| 6,144,962 A * | 11/2000 | Weinberg | G06F 11/32 | |
| 6,166,738 A * | 12/2000 | Robertson | G06F 3/04815 | 345/427 |
| 6,211,876 B1 * | 4/2001 | Ackermann | G06F 17/30675 | 704/239 |
| 6,243,094 B1 * | 6/2001 | Sklar | G06F 17/30241 | 715/810 |
| 6,347,313 B1 * | 2/2002 | Ma | G06F 17/30256 | 707/711 |
| 6,564,206 B1 * | 5/2003 | Ikeda | G06F 17/30247 | 707/722 |
| 6,583,794 B1 * | 6/2003 | Wattenberg | G06F 17/30994 | 707/999.102 |
| 6,594,673 B1 * | 7/2003 | Smith | G06F 17/30873 | |
| 6,742,003 B2 * | 5/2004 | Heckerman | G06F 17/30713 | 398/189 |
| 6,970,931 B1 * | 11/2005 | Bellamy | G06Q 10/10 | 707/999.009 |
| 7,028,050 B1 * | 4/2006 | Rose | G06F 17/30265 | |
| 7,054,870 B2 * | 5/2006 | Holbrook | G06F 17/30696 | |
| 7,085,753 B2 * | 8/2006 | Weiss | G06F 17/30707 | 707/710 |
| 7,123,269 B1 * | 10/2006 | Bourdey | G09G 5/02 | 345/423 |
| 7,213,206 B2 * | 5/2007 | Fogg | G06Q 10/10 | 715/706 |
| 7,246,128 B2 * | 7/2007 | Jordahl | G06F 17/30601 | |
| 7,315,985 B1 * | 1/2008 | Gauvin | H04L 41/12 | 715/734 |
| 7,339,597 B1 * | 3/2008 | Bourdev | G06T 11/206 | 345/619 |
| 7,373,612 B2 * | 5/2008 | Risch | G06F 17/30716 | 707/E17.093 |
| 7,404,151 B2 * | 7/2008 | Borchardt | G06F 3/04815 | 707/E17.092 |
| 7,529,743 B1 * | 5/2009 | Ershov | G06F 17/30873 | |
| 7,542,951 B1 * | 6/2009 | Chakrabarti | G06N 99/005 | 706/45 |
| 7,584,159 B1 * | 9/2009 | Chakrabarti | G06Q 30/02 | 706/45 |
| 7,599,894 B2 * | 10/2009 | Owechko | G06K 9/00369 | 382/104 |
| 7,610,185 B1 * | 10/2009 | Ershov | G06F 17/30973 | 703/3 |
| 7,617,185 B2 * | 11/2009 | Werner | G06F 17/30991 | |
| 7,720,857 B2 * | 5/2010 | Beringer | G06F 17/30991 | 345/676 |
| 7,739,611 B2 * | 6/2010 | Hirschberg | G06F 8/38 | 715/762 |
| 7,752,184 B2 * | 7/2010 | Kagawa | G06F 17/30994 | 382/130 |
| 7,831,928 B1 * | 11/2010 | Rose | G06F 17/3089 | 715/733 |
| 7,941,429 B2 * | 5/2011 | Krovitz | G06F 17/30274 | 707/723 |
| 7,958,451 B2 * | 6/2011 | Ishida | G06F 17/30873 | 707/708 |
| 7,966,632 B1 * | 6/2011 | Pan | H04N 5/44543 | 725/45 |
| 8,056,019 B2 * | 11/2011 | Borchardt | G06F 3/04815 | 707/705 |
| 8,234,581 B2 * | 7/2012 | Kake | G06F 3/0481 | 342/450 |
| 8,234,582 B1 * | 7/2012 | Haynes | G06Q 30/02 | 715/736 |
| 8,316,001 B1 * | 11/2012 | Albrecht | G06F 9/4443 | 707/706 |
| 8,332,406 B2 * | 12/2012 | Donaldson | G06Q 10/10 | 707/736 |
| 8,332,782 B1 * | 12/2012 | Chang | H04L 12/6418 | 707/794 |
| 8,352,515 B2 * | 1/2013 | Lang | G06F 17/30061 | 707/791 |
| 8,355,955 B1 * | 1/2013 | Mirchandani | G06Q 30/02 | 705/26.1 |
| 8,402,382 B2 * | 3/2013 | Agarawala | G06F 3/0483 | 345/173 |
| 8,473,524 B2 * | 6/2013 | Chauvin | G06F 17/30958 | 707/798 |
| 8,489,588 B2 * | 7/2013 | Figueroa | G06F 17/30011 | 707/726 |
| 8,510,680 B2 * | 8/2013 | Kang | G06F 3/04815 | 715/768 |
| 8,514,226 B2 * | 8/2013 | Zafar | G06Q 10/10 | 345/440 |
| 8,520,001 B2 * | 8/2013 | Evans | G06F 17/3061 | 345/440 |
| 8,533,205 B2 * | 9/2013 | Finkelstein | G06F 17/30873 | 707/737 |
| 8,555,181 B2 * | 10/2013 | Thorpe | G06Q 10/10 | 715/763 |
| 8,593,488 B1 * | 11/2013 | Thimbleby | G06T 11/00 | 345/619 |
| 8,635,281 B2 * | 1/2014 | Kelly | G06Q 10/10 | 709/205 |
| 8,656,314 B2 * | 2/2014 | Locker | G06F 3/04883 | 345/173 |
| 8,666,979 B2 * | 3/2014 | Chen | G06F 17/30525 | 705/319 |
| 8,739,051 B2 * | 5/2014 | Green | G06F 3/0482 | 715/767 |
| 8,832,119 B2 * | 9/2014 | Girgensohn | G06F 17/30058 | 345/619 |
| 8,839,091 B2 * | 9/2014 | Ramamurthy | G06F 17/30716 | 715/227 |
| 8,949,250 B1 * | 2/2015 | Garg | G06F 17/3053 | 707/748 |
| 9,047,847 B2 * | 6/2015 | Hochmuth | G09G 5/377 | |
| 9,087,117 B2 * | 7/2015 | Cao | G06F 17/30601 | |
| 9,135,331 B2 * | 9/2015 | Rosenthal | G06F 17/30696 | |
| 9,176,642 B2 * | 11/2015 | Borchardt | G06F 3/04815 | |
| 9,262,488 B2 * | 2/2016 | Sun | G06F 17/30554 | |
| 9,342,579 B2 * | 5/2016 | Cao | G06F 17/30601 | |
| 9,466,138 B2 * | 10/2016 | Singh | G06T 11/206 | |
| 2002/0062300 A1 * | 5/2002 | Asadov | G06F 17/30861 | |
| 2003/0001873 A1 * | 1/2003 | Garfield | G06F 17/30014 | 715/700 |
| 2003/0028451 A1 * | 2/2003 | Ananian | G06F 17/30867 | 705/26.42 |
| 2003/0033296 A1 * | 2/2003 | Rothmuller | G06F 17/30017 | |
| 2003/0167278 A1 * | 9/2003 | Baudel | G06F 17/30716 | |
| 2003/0167324 A1 * | 9/2003 | Farnham | G06F 3/0481 | 709/224 |
| 2003/0200191 A1 * | 10/2003 | Pao | G06K 9/6253 | 706/47 |
| 2003/0208323 A1 * | 11/2003 | Hao | G06F 17/50 | 702/41 |
| 2003/0233460 A1 * | 12/2003 | Drucker | G06F 17/30029 | 709/228 |
| 2004/0068552 A1 * | 4/2004 | Kotz | H04L 29/06027 | 709/218 |
| 2004/0076345 A1 * | 4/2004 | Olszak | G06F 17/30855 | 382/309 |
| 2005/0055232 A1 * | 3/2005 | Yates | G06Q 10/10 | 705/1.1 |
| 2005/0065733 A1 | 3/2005 | Caron et al. | | |
| 2005/0114802 A1 * | 5/2005 | Beringer | G06F 17/30991 | 715/700 |
| 2005/0117530 A1 * | 6/2005 | Abraham | H04W 52/0232 | 370/310 |
| 2005/0165680 A1 * | 7/2005 | Keeling | G06Q 20/02 | 705/40 |
| 2005/0192956 A1 * | 9/2005 | Evans | G06F 17/3071 | |

(56) References Cited

U.S. PATENT DOCUMENTS

| | | | |
|---|---|---|---|
| 2006/0082592 A1* | 4/2006 | Black-Ziegelbein | G06T 11/206 345/605 |
| 2006/0106743 A1* | 5/2006 | Horvitz | G06N 99/005 706/21 |
| 2006/0106847 A1* | 5/2006 | Eckardt, III | G06F 17/30696 |
| 2006/0112098 A1* | 5/2006 | Renshaw | G06F 17/30749 |
| 2006/0121436 A1* | 6/2006 | Kruse | G06F 3/0481 434/433 |
| 2006/0164409 A1* | 7/2006 | Borchardt | G06F 3/04815 345/419 |
| 2006/0258448 A1* | 11/2006 | Ishibashi | A63F 13/10 463/31 |
| 2006/0262145 A1* | 11/2006 | Zhang | G06Q 10/10 345/661 |
| 2006/0290697 A1* | 12/2006 | Madden | G06T 11/206 345/440 |
| 2007/0083818 A1* | 4/2007 | Drucker | G06F 17/30029 715/767 |
| 2007/0136756 A1* | 6/2007 | Ishida | H04N 7/17318 725/46 |
| 2007/0226207 A1* | 9/2007 | Tawde | G06F 17/3071 |
| 2007/0271270 A1* | 11/2007 | Dubinko | G06F 17/30864 |
| 2007/0271297 A1* | 11/2007 | Jaffe | G06F 17/30041 |
| 2007/0271524 A1* | 11/2007 | Chiu | G06F 3/0481 715/767 |
| 2007/0283290 A1* | 12/2007 | Dubinko | G06F 17/30994 715/784 |
| 2008/0010148 A1* | 1/2008 | Knibiehly | G06Q 30/00 705/14.23 |
| 2008/0033897 A1 | 2/2008 | Lloyd et al. | |
| 2008/0104225 A1* | 5/2008 | Zhang | H04L 67/36 709/224 |
| 2008/0120325 A1* | 5/2008 | Davis | G06F 17/30035 |
| 2008/0133213 A1* | 6/2008 | Pollara | G06F 17/30731 703/22 |
| 2008/0195460 A1* | 8/2008 | Varghese | G06Q 30/02 705/14.25 |
| 2008/0215496 A1* | 9/2008 | Hockley | G06Q 40/06 705/36 R |
| 2008/0232695 A1* | 9/2008 | Noda | G06F 17/30274 382/224 |
| 2008/0263022 A1* | 10/2008 | Kostorizos | G06F 17/30864 |
| 2008/0307359 A1* | 12/2008 | Louch | G06F 3/0481 715/835 |
| 2008/0313200 A1* | 12/2008 | Archer | G06F 17/30604 |
| 2009/0063134 A1* | 3/2009 | Gallagher | G06F 17/27 704/10 |
| 2009/0089410 A1* | 4/2009 | Vicente | G06F 9/45533 709/223 |
| 2009/0100343 A1* | 4/2009 | Lee | G06Q 10/10 715/733 |
| 2009/0125620 A1* | 5/2009 | Klincewicz | H04L 41/048 709/223 |
| 2009/0132236 A1* | 5/2009 | Kislyuk | G06F 17/3087 704/9 |
| 2009/0132349 A1* | 5/2009 | Berkley | G06F 17/30896 715/202 |
| 2009/0150514 A1* | 6/2009 | Davis | H04L 29/12028 709/217 |
| 2009/0234899 A1* | 9/2009 | Kramer | G06F 17/30539 708/200 |
| 2009/0299853 A1* | 12/2009 | Jones | G06Q 30/02 705/14.46 |
| 2009/0327320 A1* | 12/2009 | Yan | G06F 17/30705 |
| 2010/0010912 A1* | 1/2010 | Jones | G06Q 30/0601 705/26.1 |
| 2010/0030578 A1* | 2/2010 | Siddique | G06Q 10/0637 705/3 |
| 2010/0030769 A1* | 2/2010 | Cao | G06F 17/30696 707/738 |
| 2010/0054703 A1* | 3/2010 | Tanaka | G06F 17/30817 386/241 |
| 2010/0106486 A1 | 4/2010 | Hua et al. | |
| 2010/0106752 A1* | 4/2010 | Eckardt, III | G06F 17/30696 707/805 |
| 2010/0131899 A1* | 5/2010 | Hubert | G06F 17/30917 715/823 |
| 2010/0169331 A1* | 7/2010 | Karidi | G06F 17/30864 707/754 |
| 2010/0169828 A1* | 7/2010 | Kho | G06F 9/4443 715/810 |
| 2010/0229082 A1* | 9/2010 | Karmarkar | H04M 1/72547 715/205 |
| 2010/0262477 A1* | 10/2010 | Hillerbrand | G06Q 30/02 705/14.16 |
| 2010/0313124 A1* | 12/2010 | Privault | G06F 3/0488 715/702 |
| 2011/0004532 A1* | 1/2011 | Yu | G06Q 20/322 705/26.41 |
| 2011/0004851 A1* | 1/2011 | Nurmi | G06F 3/04883 715/853 |
| 2011/0016121 A1* | 1/2011 | Sambrani | G06F 17/30702 707/734 |
| 2011/0060738 A1* | 3/2011 | Gates | G06F 17/30749 707/737 |
| 2011/0072012 A1* | 3/2011 | Ah-Pine | G06F 17/30274 707/725 |
| 2011/0125743 A1* | 5/2011 | Immonen | G06F 17/30241 707/737 |
| 2011/0202886 A1* | 8/2011 | Deolalikar | G06F 17/30707 715/853 |
| 2011/0231489 A1* | 9/2011 | Rathod | G06F 17/30867 709/204 |
| 2011/0283205 A1* | 11/2011 | Nie | G06F 17/30861 715/763 |
| 2011/0295727 A1* | 12/2011 | Ferris | G06F 11/34 705/34 |
| 2012/0005045 A1* | 1/2012 | Baker | G06Q 30/0643 705/27.2 |
| 2012/0054226 A1* | 3/2012 | Cao | G06F 17/30941 707/769 |
| 2012/0084695 A1* | 4/2012 | Higgins | G06F 8/33 715/771 |
| 2012/0137367 A1* | 5/2012 | Dupont | G06F 21/00 726/25 |
| 2012/0144309 A1* | 6/2012 | Zendler | G06F 3/04815 715/739 |
| 2012/0216114 A1* | 8/2012 | Privault | G06F 3/04883 715/702 |
| 2012/0290988 A1* | 11/2012 | Sun | G06F 17/30572 715/853 |
| 2012/0311496 A1* | 12/2012 | Cao | G06F 17/30601 715/821 |
| 2013/0006636 A1* | 1/2013 | Mizuguchi | G06F 17/30616 704/245 |
| 2013/0129231 A1* | 5/2013 | Dale | G06K 9/6254 382/224 |
| 2013/0275906 A1* | 10/2013 | Caire | G06F 8/34 715/771 |
| 2014/0019879 A1 | 1/2014 | Krajec et al. | |
| 2014/0052763 A1* | 2/2014 | Sato | G06F 3/0488 707/805 |
| 2014/0280241 A1 | 9/2014 | Reblitz-richardson et al. | |
| 2015/0100568 A1* | 4/2015 | Golden | G06N 5/02 707/722 |
| 2015/0169179 A1* | 6/2015 | Wang | G06F 17/30 715/835 |
| 2015/0278346 A1* | 10/2015 | Aiello | G06F 17/30663 707/748 |
| 2015/0339835 A1* | 11/2015 | Mohr | G06F 17/30958 345/440 |
| 2015/0347628 A1 | 12/2015 | Krajec et al. | |
| 2016/0048556 A1* | 2/2016 | Kelly | G06F 17/30867 707/767 |
| 2016/0320943 A1 | 11/2016 | Kim et al. | |
| 2016/0343005 A1 | 11/2016 | Liu et al. | |

(56) References Cited

U.S. PATENT DOCUMENTS

2016/0357872 A1* 12/2016 Fader ............... G06F 17/30867
2017/0061456 A1    3/2017 Feng et al.

OTHER PUBLICATIONS

Chan et. al. "A Machine learning approach to anomaly detection" Mar. 2003.*
Bay et. al. "Data Mining methods for anomaly detection KDD-2005 Workshop report" Aug. 2005.*
The Open Research Web: A Preview of the Optimal and the Inevitable, http://web.archive.org/web/20091016024002/http://cogprints.org/4841/1/shad-bch.htm, Oct. 16, 2009, pp. 1 to 12.
Segmentation of Twitter Timelines via Topic Modeling, http://alexperrier.github.io/jekyll/update/2015/09/16/segmentation_twitter_timelines_lda_vs_lsa.html, Sep. 16, 2015, pp. 1 to 11.

* cited by examiner

SUMMARIZED NETWORK GRAPH FOR SEMANTIC SIMILARITY GRAPHS OF LARGE CORPORA

BACKGROUND

1. Field

The present disclosure relates generally to graph analysis and, more specifically, to automatically extracting insightful nodes from graphs.

2. Description of the Related Art

Graphs are powerful data models for understanding systems in which relationships between entities are important. Examples include graphs characterizing relationships between documents, like semantic similarity between each document in a corpus, such as news articles published in a given decade, or between websites, or between scientific journal articles. Other examples include graphs characterizing relationships between other entities, like between companies, countries, or people, such as graphs relating exchanges there between or similarities there between.

Such graphs, however, can be difficult for humans to interpret, as the amount of information contained can massively exceed the capabilities of human cognition. Many typical applications have well in excess of 1,000 nodes and well in excess of 5,000 edges between those nodes. Lacking adequate tools for synthesizing knowledge from such data structures, many analysts fail to discover useful insights buried in graphs.

SUMMARY

The following is a non-exhaustive listing of some aspects of the present techniques. These and other aspects are described in the following disclosure.

Some aspects include a process including: obtaining a clustered graph, the clustered graph having three or more clusters, each cluster having a plurality of nodes of the graph, the nodes being connected in pairs by one or more respective edges; determining visual attributes of cluster icons based on amounts of nodes in clusters corresponding to the respective cluster icons; determining positions of the cluster icons in a graphical visualization of the clustered graph; obtaining, for each cluster, a respective subset of nodes in the respective cluster; determining visual attributes of node icons based on attributes of corresponding nodes in the subsets of nodes, each node icon representing one of the nodes in the respective subset of nodes; determining positions of the node icons in the graphical visualization based on the positions of the corresponding cluster icons of clusters having the nodes corresponding to the respective node icons; and causing the graphical visualization to be displayed.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
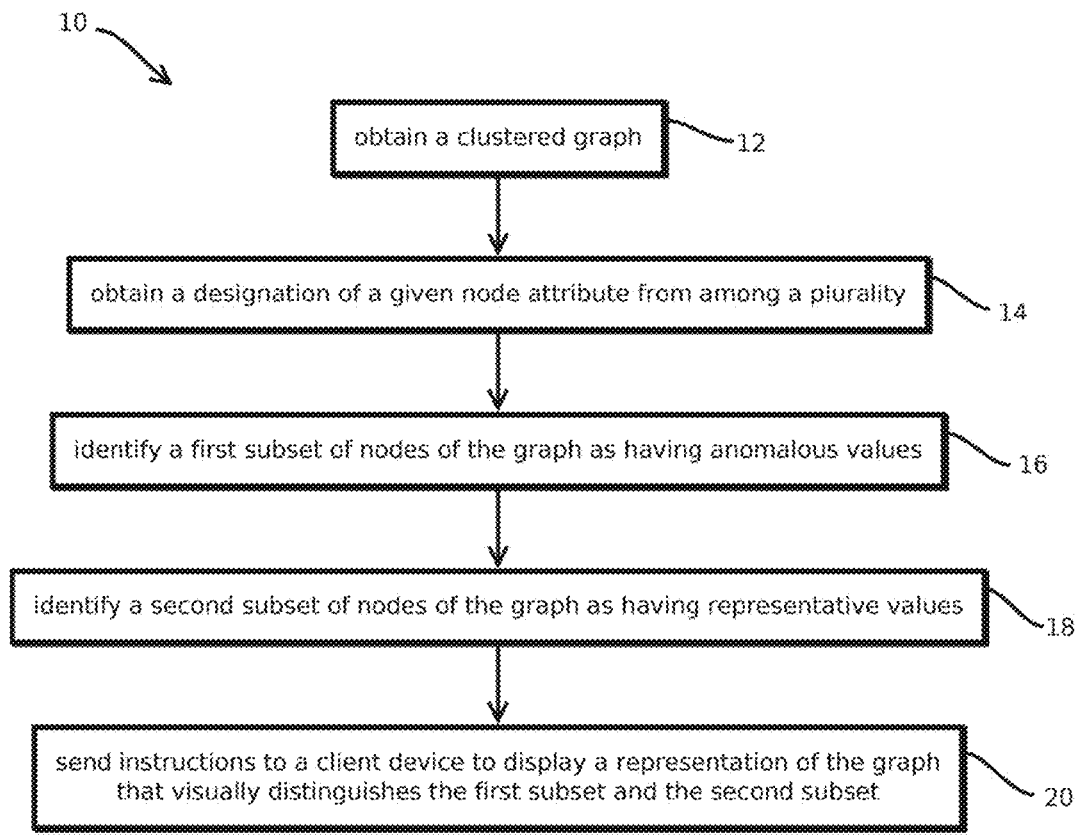
FIG. 1 illustrates an example of a process by which insightful nodes in a graph may be identified, in accordance with some embodiments of the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science and human-computer interaction. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

There are a number of techniques for visualizing graph data structures, but many of these techniques impose trade-offs on the user that make it difficult to extract insights from the data. Some techniques isolate individual nodes of the graph and present information about those nodes in isolation, for example, many online search engines provide a set of top-ranked search results based on links between documents. Alternatively, some techniques depict larger, aggregate structures within the graph. For instance, techniques exist for generating graphic visualizations of clusters of nodes in graph data structures. However, these techniques often leave the user with a choice between fine-grained investigation of aspects of individual nodes or developing insights from patterns and themes emerging from large collections of nodes. Often, insights from one scale are deeper when informed by information about the other scale.

Some embodiments may generate a graphic visualization of a graph data structure that provides both relatively fine-grained context to the information presented, in some cases with node-specific graphical elements, while displaying that fine-grained context in arrangements that provide information about the larger structure of the graph. Further, some embodiments may generate these visualizations with computational techniques that accelerate the generation of the visualization on one or more computers, making such visualizations attractive to users unwilling to endure relatively long delays when requesting or adjusting such visualizations.

For example, some embodiments may display both clusters and selected nodes within those clusters, in some cases, with visual attributes indicating information about the respective items, and in some cases, with positioning and sizing such that relationships between these items is apparent to the viewer, for instance, at a single glance. Further, some embodiments may include user selectable inputs by which aspects of the graph data structure may be interrogated, analyzed, and explored to relatively quickly derive insights that would be difficult to otherwise obtain on relatively large data structures. Examples of these techniques are described below with reference to FIGS. 4 and 5A and 5B.

The described embodiments are best understood in view of an example of an environment in which the embodiments may be deployed. In some cases, that environment generates the graph data structure, clusters nodes, and selects subsets of those nodes for distinctive treatment in the graphic visualization.

To this end, some embodiments identify "insightful" attributes of nodes in graphs (e.g., attributes exhibiting anomalous or representative behavior relative to the graph population of node metadata or edge properties). Some embodiments may identify such attributes and identify nodes and clusters having anomalous or representative values with respect to such attributes. In some embodiments, such calculations may be computationally infeasible if performed with naive, brute force techniques, with available computing resources, subject to user expectations for latency, with commercially relevant sized graphs. To expedite operations, and improve upon the operation of computer systems, some embodiments may construct probability models that model distributions of measures of central tendency (e.g., means, modes, or medians) of attributes, e.g., based on combinatorics according to cluster measures of central tendency, variance, and sizes of the clusters in the graph. The present techniques are described with respect to document relationship graphs, but these approaches are also useful in other domains in which graphs exist, e.g., in graphs between entities other than documents, like people, companies, objects, places, etc.

For instance, in some cases, the user or system administrator may explicitly define node metadata and edge properties of interest to the user. For example, the following may be defined as of interest for the nodes (e.g., articles) within a semantic similarity network: a) node metadata, like social sharing count; and b) node edge properties, like degree, bridges to another topic, etc.

But in many cases, the appropriate attributes to select to reveal interesting nodes are not readily apparent. Accordingly, some embodiments may automatically identify these attributes (e.g., node metadata or edge properties). If node metadata and edge properties of interest have not been defined, some embodiments automatically determine potentially insightful attributes.

This may including determining insightful node metadata attributes. To this end, some embodiments may execute the following pseudocode routine:
for each node metadata attribute (as defined by the data)
// 1. determine insightful node attributes
calculate the <variance> of that attribute's values
if variance exceeds some threshold then the metadata attribute is a candidate to reveal "insight" select the top X node metadata attributes as insightful metadata attributes, where X is a threshold integer configured by the user.
// 2. determine representative nodes
calculate the average value of the attribute
select a node that is close to this average as being representative Further, some use cases may include determining insightful nodes based on edge properties of interest for each edge property (as defined by graph properties) with the following pseudocode routine:
// 1. determine insightful nodes based on insightful edges
calculate the <variance> of that property's values
if variance exceeds some threshold then the edge property is a candidate to reveal "insight"
select the top X candidates as insightful metadata attributes, again where X is a user configured integer value.
// 2. determine representative nodes based on edge properties
calculate the average value of the edge attributes
select a node that is close (e.g, within a threshold, or closest) to this average as being representative.

Some embodiments may determine insightful attributes and nodes exhibiting interesting values of those attributes on a cluster-by-cluster basis.

In a graph (also referred to as a network) of 1000 nodes or more, there are typically at least 15 or more clusters. Some embodiments may identify clusters with possibly interesting properties that can be analyzed further. Some embodiments use distributions to statistically define clusters that may be anomalies in that network. More specifically, some embodiments use a particular attribute cluster median in a network to identify an anomaly in a cluster. In a network, each cluster typically has a number of nodes, and each node would have a set of attributes associated with it depending on the type of network.

For example, a company network may have an attribute such as total investment amount for each company. Each cluster in that network may have a median for that attribute, so each cluster would have a total investment amount median. Theoretically, a distribution for the cluster median of that attribute would exist. The distribution may represent a frequency table of the possible occurrence of different cluster median in that cluster, so it is showing that if an embodiment created all the possible different combinations of nodes for a cluster of that size how often would different cluster medians occur in different combinations.

For instance, with a cluster of 5 nodes, then some embodiments go through all the possible combinations of 5 nodes from that network. Each different combinations of that cluster has its cluster median, and the distribution of those medians shows the frequency of different cluster median from all the possible combinations of that cluster size.

Thus, some embodiments may count different possible combinations of a cluster in a network to create a true distribution of a cluster median, or some embodiments may create a probability model for a cluster median in a network, e.g., by sampling the possible combinations. The probability model may depend on the actual cluster median and the size of each cluster in the network. In some embodiments, the model presents a probability of getting a cluster median that is less than the actual cluster median.

For example, if the model outputs 0.921, then you can interpret it as 92.1% of the cluster medians from the true distribution of that cluster median would be less than the cluster's actual median from the network. With this value, some embodiments identify an outlier probability depending on the context of the network.

The computation of the model may be reduced to a calculation based on combinatorics. In testing, the probability model has been validated through a simulation of the cluster median's true distribution. In 10,000 data points of an attribute sampled from an existing network with its individual clusters. The 10,000 data points from each cluster create a simulated distribution of the cluster medians, and the number of cluster medians that are less than the actual cluster median of the network in the simulated distribution divided by the total number of cluster medians (10,000 in this case) gives the percentage of having a cluster median less than the actual cluster median. This is the same probability from the probability model above. The difference between the simulation probability and the model probability in some tests is less than 3 decimal points, so the probability model is expected to be a valid form of calculating the probability of getting a cluster median less than the actual cluster median from the network. These techniques are illustrated in greater detail in the figures.

In some embodiments, a process 10 illustrated by FIG. 1 may be executed by the computational linguistics system described below with reference to FIG. 3, for instance, implemented on one or more instances of the computer system described below with reference to FIGS. 5A and 5B. In some cases, the process of FIG. 1, and the other processes described herein may be encoded as program code on a tangible, non-transitory, machine readable media, for instance as program code that when executed effectuate the operations described. The steps of these processes need not all be performed, nor need the steps be performed in the order recited, and in some cases, some or all of the steps may be executed concurrently on multiple instances of the computing system to expedite operations, none of which is to suggest that any other feature described herein is not amenable to similar variation.

Figure 2:
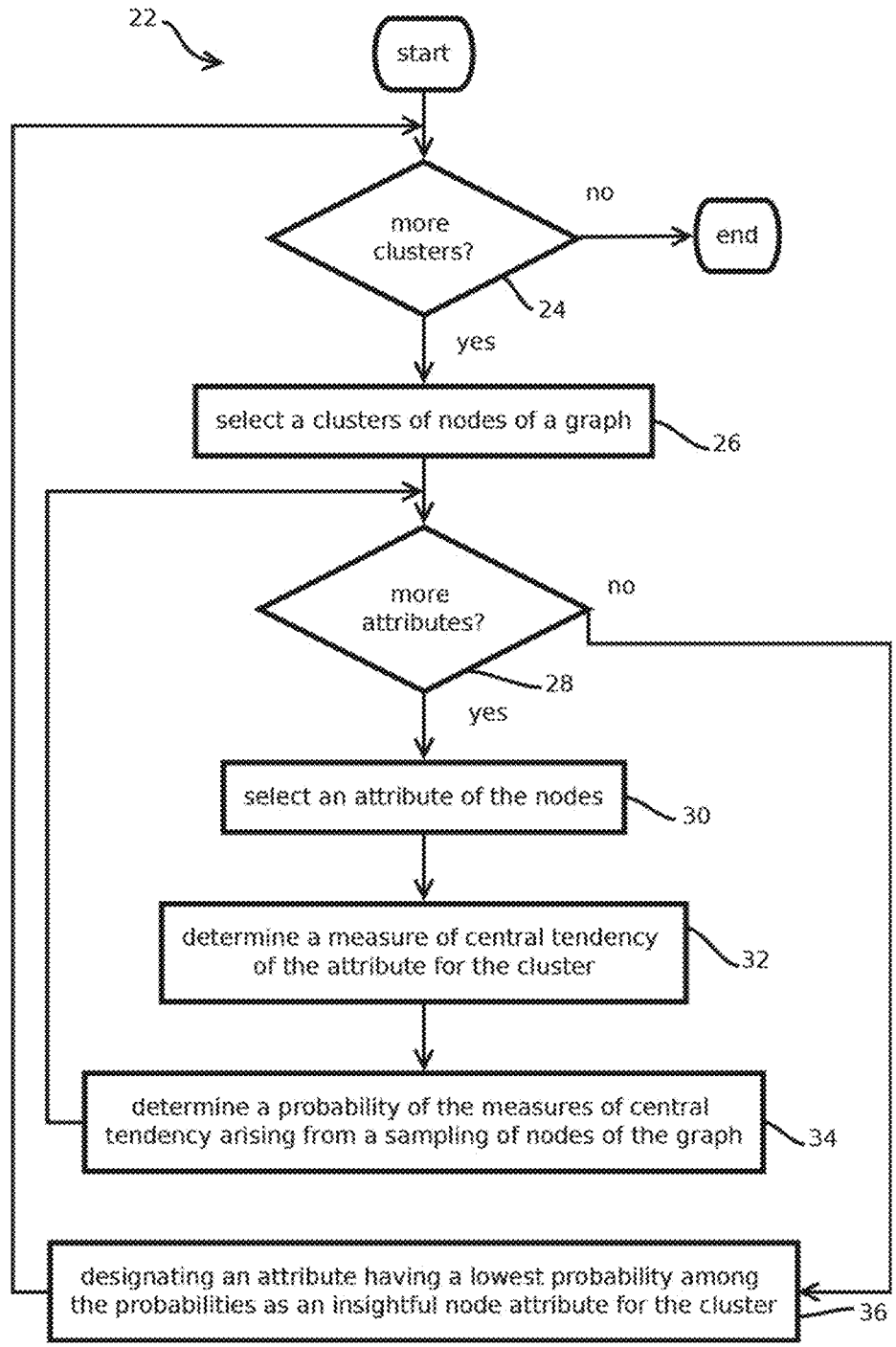
FIG. 2 illustrates an example of a process by which attributes indicative of insightful nodes may be identified, in accordance with some embodiments of the present techniques.

In some embodiments, the process 10 may identify attributes indicative of insightful nodes, for instance via the process of FIG. 2 or the above describe techniques, and then designate those insightful nodes before forming a graphical representation of a clustered graph that calls attention to those insightful nodes.

In some embodiments, the process 10 begins with obtaining a clustered graph, as indicated by block 12. In some cases, the clustered graph may include a relatively large number of nodes, each node corresponding to some entity, document, or other item. In some embodiments, the graph may include more than 1000 nodes, more than 5000 nodes, and in many commercially relevant implementations, as many as 100,000 nodes or more. In some embodiments, the edges of the graph may also be obtained, and each edge may connect a respective pair of the nodes. In some embodiments, the edges are weighted edges, with scores indicating the strength of relationships between the nodes. In some embodiments, the number of edges may also be relatively large, for instance, more than two, three, or ten times the number of nodes included. In some cases, every single node may be connected to every other node, for instance, in a data structure referred to below as an adjacency matrix, or some embodiments may operate upon pruned graphs where weaker connections have been removed.

In some cases, the relationships between the nodes may depend on what the nodes represent and the use case. In some embodiments, the relationships are relationships between documents, such as similarity of semantic content of unstructured text, similarity of sentiment, similarity of various topics that may be addressed, and the like, examples of which are described in greater detail below with reference to FIG. 3. In other examples, the graph nodes may represent various non-document entities, such as people, governments, geographic regions, countries, demographic groups, and the like. In some cases, the relationships between these entities, for instance encoded, as edge weights, may include things like transactions between the entities, such as frequency or magnitude of transactions, co-occurrences of entities, similarities between entities, dissimilarities between entities, and the like.

In some embodiments, each edge may include multiple weights, and in some cases, the edges may be directed edges with the weights having a value that implies one node is acting upon the other. In some cases, different types of edges may be included, such as edges representing semantic similarity, edges representing similarity of sentiment, and cross-citation edges indicating if one document cites the other.

In some embodiments, each node may be associated with a relatively large number of attributes, such as more than 5, more than 10, more than 100, or more than 1000 in some cases. Generally, the attributes of a node are distinct from the identifier of the node and may include things like edge properties of edges connected to the node and attributes of the item represented by the node. For example, such non-edge property attributes may include things like an amount of times a document represented by the node was shared on a social media network, an amount of times a document was commented upon, an amount of times a document was edited, an amount of times a document mentions a particular n-gram, a topic score or set of topics scores for a particular document, and the like. In some cases, where the nodes represent nondocument items, the attributes may be similarly various, examples including, for nodes representing businesses, measures of the performance of the business, like profitability, revenue, amount of funding raised, employee count, employee turnover, market rank, markets served, geolocation, and the like. Or for nodes representing individuals, attributes may represent interests, occupation, age, income, and the like.

In some cases, the graph may be a clustered graph in which collections of nodes are grouped into clusters according to various criteria, such as based on edges connecting the nodes. In some cases, clusters may be clustered according to a graph clustering algorithm, like a Markov cluster algorithm. Some embodiments may randomly walk the graph, e.g., with probabilities weighted according to edge weights, and record other nodes visited, in some cases including self-referential edges. Based on these random walks, some embodiments may form a transition probability matrix indicating the probability of traveling from one node to another. Some embodiments may normalize the transition probability matrix. Some embodiments may then iteratively expand the matrix by taking the eth power of the matrix and then inflate the matrix by taking the inflation of the resulting matrix according to a configurable parameter. Some embodiments may repeat these iteration until the matrix converges to reveal clusters according to positive values along rows of the converged matrix.

In some embodiments, the graph may include a relatively large number of clusters, such as more than five, more than 10, more than 100, or more than 1000, with each cluster including various numbers of nodes, such as more than three, more than five, more than 10, or more than 100. In some embodiments, the graph may be obtained and clustered according to the techniques described below with reference to FIG. 3. Some embodiments may include a set of clusters, and each cluster may be associated with a set of nodes designated as belonging to that respective cluster.

Next, some embodiments may obtain a designation of a given node attribute from among a plurality, such as a plurality of the nodes attributes, as indicated by block 14. In some cases, the designation may be supplied by an analyst or administrator, for instance, by explicitly designating a particular attribute among a list of the attributes, for example, as presented remotely on a client computing device in a selectable list. In other cases, the designation may be inferred by detecting nodes deemed insightful, e.g., based on the measures described herein. Examples of attribute insightfulness are described above and in greater detail below. In some cases, different attributes may be designated for the different clusters, or some embodiments may apply the same attribute to multiple clusters or all of the clusters. In some cases, the given node attribute may be an edge property of a node, like a number of connections to other nodes, a number of connections to the nodes in other clusters, a percentage of connections to nodes in other clusters relative to all connections, a measure of central tendency of edge weights of connected edges, a variance of edge weights of connected edges, an edge that connects between topics, and the like. In other examples, the attribute may be one of the above-described non-edge property attributes.

Next, some embodiments may identify a first subset of nodes of the graph as having anomalous values, as indicated by block 16. In some embodiments, a value may be deemed anonymous in response to that value falling with an outlier portion of a distribution of the attributes values, for instance, within the cluster or within the graph. For example, some embodiments may designate as anomalous those nodes having attribute values more than three standard deviations above a mean or more than three standard deviations below the mean. In some cases, the first subset may be subdivided into those nodes having outliers on a high side and those nodes having outliers on the low side, and some embodiments may graphically represent these two groups differently in subsequent steps. In some embodiments, other distributions may be encountered, and anomalous values may be designated with similar techniques, for instance, by determining which portion of that distribution corresponds to less than a threshold percentage, such as less than 0.01% of a distribution. Examples of other distributions expected to be encountered include power law distributions, binomial distributions, and Bernoulli distributions.

In some cases, attributes may be designated according to attributes standing alone and interactions between attributes, e.g., the ratio of pairwise combinations of attributes. In some cases, attributes may be identified by generating an attribute vector for each node, with the attribute values corresponding to dimensions in the attribute vector space. Some embodiments may execute a density based clustering algorithm, like the variants of DB-SCAN described below and designate those nodes having outlier attribute vectors outside of the resulting clusters in attribute-vector space as interesting nodes. Similarly, some embodiments may designate those near a centroid of the clusters in attribute-vector space as interesting for being representative.

In some cases, the identification of the first subset may include operations that are performed concurrently on multiple threads or multiple computing devices, for instance, by dividing the nodes of the graph among a plurality of computing devices (e.g., with frameworks like Apache Spark or Hadoop), and having each of the plurality of computing devices report back the portion of the assigned nodes that qualify as anomalous, thereby expediting operations relative to single threaded processes, though embodiments are also consistent with single threaded processes.

Next, some embodiments may identify a second subset of nodes of the graph as having representative values, as indicated by block 18. Nodes may be designated as representative based on those nodes having an attribute value closest to a measure of central tendency of the attribute, for instance, for the cluster, or for the graph. For example, some embodiments may determine which node has a closest value to a mean value of the attribute for the cluster or for the graph. In other embodiments, the representative nodes may be selected, for instance randomly, among a set of nodes within some threshold of a measure of central tendency, for instance within plus or minus one half of one standard deviation of a mean of a distribution of the designated node attribute. Again, in some embodiments, this process may be performed concurrently using techniques similar those described with reference to block 16.

Next, some embodiments may send instructions to a client device to display a representation of the graph that visually distinguishes the first subset and the second subset, as indicated by block 20. Examples of a graphical representation of the graph are described below with reference to FIG. 4. In some cases, the graph may visually represent clusters of the nodes, in some cases showing the nodes, or in other cases not showing the nodes, to make the image easier to visually parse, though embodiments are consistent with the techniques. In some embodiments, the first subset of nodes may be visually identified differently depending upon whether the members of the first subset are outliers on a high side or outliers in a low side. Similarly, some embodiments may visually distinguish members of the first subset for members of the second subset, and members of both subsets from the clusters. In some cases, the graphical representation may be sent for display in a web browser, for instance encoded with instructions that engage a graphics processing unit for faster rendering.

As noted, insightful attributes may be identified with a variety of techniques, including graph wide and on a cluster by cluster basis. FIG. 2 shows an example of a process 22 that in some cases identifies insightful attributes on a cluster by cluster basis. In some embodiments, the result of FIG. 2 may constitute the designation of a given attribute in block 14 of FIG. 1. In some embodiments, the process of FIG. 2 may occur in the pipeline of FIG. 1, for instance after obtaining a clustered graph in block 12, and as part of obtaining a designation of a given node attribute in block 14.

In some embodiments, the process of FIG. 2 may include determining whether all clusters in a clustered graph have been processed, as indicated by block 24. Upon determining that all clusters have been processed, the process may terminate, for instance by proceeding to block 14 of FIG. 1. Alternatively, in some embodiments, some iterations may proceed to select a cluster of nodes of the graph, as indicated by block 26. In some cases, some embodiments may iterate through a list of clusters, or some embodiments may assign clusters to different computing processes, such as different threads on a single machine, or different processes on different computing devices, for concurrent analysis of the clusters and faster operation using the techniques described above, though embodiments are consistent with single threaded processes.

Next, some embodiments may determine whether all attributes of the selected cluster have been process, as indicated by block 28. Upon determining that at least some attributes have not been processed, some embodiments may proceed to block 30 and select an attribute of the nodes, such as an attribute that has not yet been processed. Some embodiments may also parallelize this an subsequent operations, for instance by assigning different attributes of the cluster to different threads or different computing devices for concurrent analysis and those processes may report back the various probabilities described below, e.g., to a master node of a compute cluster.

Next, some embodiments may determine a measure of central tendency of the attribute for the cluster, as indicated by block 32. A variety of different measures of central tendency may be determined, such as a mean, a mode, or a median value. In some cases, for instance where the clusters are relatively large, determining a measure of central tendency may include estimating a measure of central tendency, for instance by randomly sampling among members of the cluster, for instance more than 20 or more than 50, to estimate the measure of central tendency for the population.

Some embodiments may also determine an amount of variation of the attribute, for instance, for the cluster, and select those attributes having a relatively large variation, for instance relative to other clusters. For example, some embodiments may also determine a standard deviation or variance of the attribute for the cluster and compare that value to the variance or standard deviation of other clusters. Some embodiments may then select those attributes having the largest or smallest standard deviation relative to those of other clusters, for example, by normalizing against a mean standard deviation for the graph as a whole.

Next, some embodiments may determine a probability of the measures of central tendency arising from a random sampling of nodes of the graph, as indicated by block 34. For example, some embodiments may determine a number of nodes in the respective cluster. Some embodiments may then determine every combination of nodes in the graph as a whole of the same size and, for each combination, calculate a respective measure of central tendency to create a population of measures of central tendency, e.g., a distribution of means, medians, or modes. Some embodiments may then determine where the measure of central tendency obtained in block 34 falls within this population, for instance, based on statistics of that population, like a mean and standard deviation. For example, some embodiments may determine that the measure of central tendency from block 34 is larger than 99.5% of the measures of central tendency in the population obtained in step 34, thereby indicating that the measure of central tendency in block 32 is relatively unlikely to arise from arbitrary selections of nodes. Similarly, some embodiments may determine that the measure of central tendency from block 32 is smaller than all but 1% of the population of measures of central tendency obtained in the processes of block 34, thereby similarly indicating that the measure of central tendency in block 32 is relatively improbable. In some cases, this probability may be stored in memory for comparison with probabilities of other attributes of the respective cluster to select the most improbable attributes.

In some embodiments, determining measures of central tendency for every combination of nodes in the graph of the size of the cluster at issue may be too computationally expensive to be completed in a reasonable amount of time, such as less than one hour. For example, the number of combinations may scale relatively poorly with the number of nodes, for instance as a binomial coefficient. To expedite operations and cause the computer to reach a result faster, some embodiments may sample among these combinations, for instance randomly (e.g. pseudo-randomly, like according to a linear shift register selecting among note identifiers) selecting nodes of the graph (including nodes outside of the cluster at issue) until an amount equal to that of the size of the cluster at issue is selected to form a sample instance, and a measure of central tendency may be calculated for that sample instance. This process may be repeated to create a sample set of measures of central tendency, and some embodiments may statistically model that distribution, for instance by calculating a mean and standard deviation, which may be used by some embodiments to determine the probability of the measure of central tendency obtained in block 32 with statistical inference, e.g., means for the cluster more than three standard deviations from the mean of means for the samples may be deemed indicative of insightful attributes.

Upon determining the probability of observing the measure of central tendency calculated in block 32 for the cluster at issue, based on distributions of such measures for other collections of a similar size within the graph, some embodiments may return to the determination of block 28 and ascertain whether attributes remain that have not yet been analyzed. Upon determining that no more attributes remain, some embodiments may proceed to block 36 and designate an attribute having a lowest probability among the probabilities as an insightful node attribute for the cluster. For example, some embodiments may identify those attributes or attribute having less than a threshold determined probability of being observed or those attributes having less than a threshold rank according to this probability, such as the attribute having the lowest probability. In some embodiments, the respective attribute or attributes may be associated with cluster, and those attributes may be applied in subsequent processes, for instance in step 16 and 18 of FIG. 1.

Figure 3:
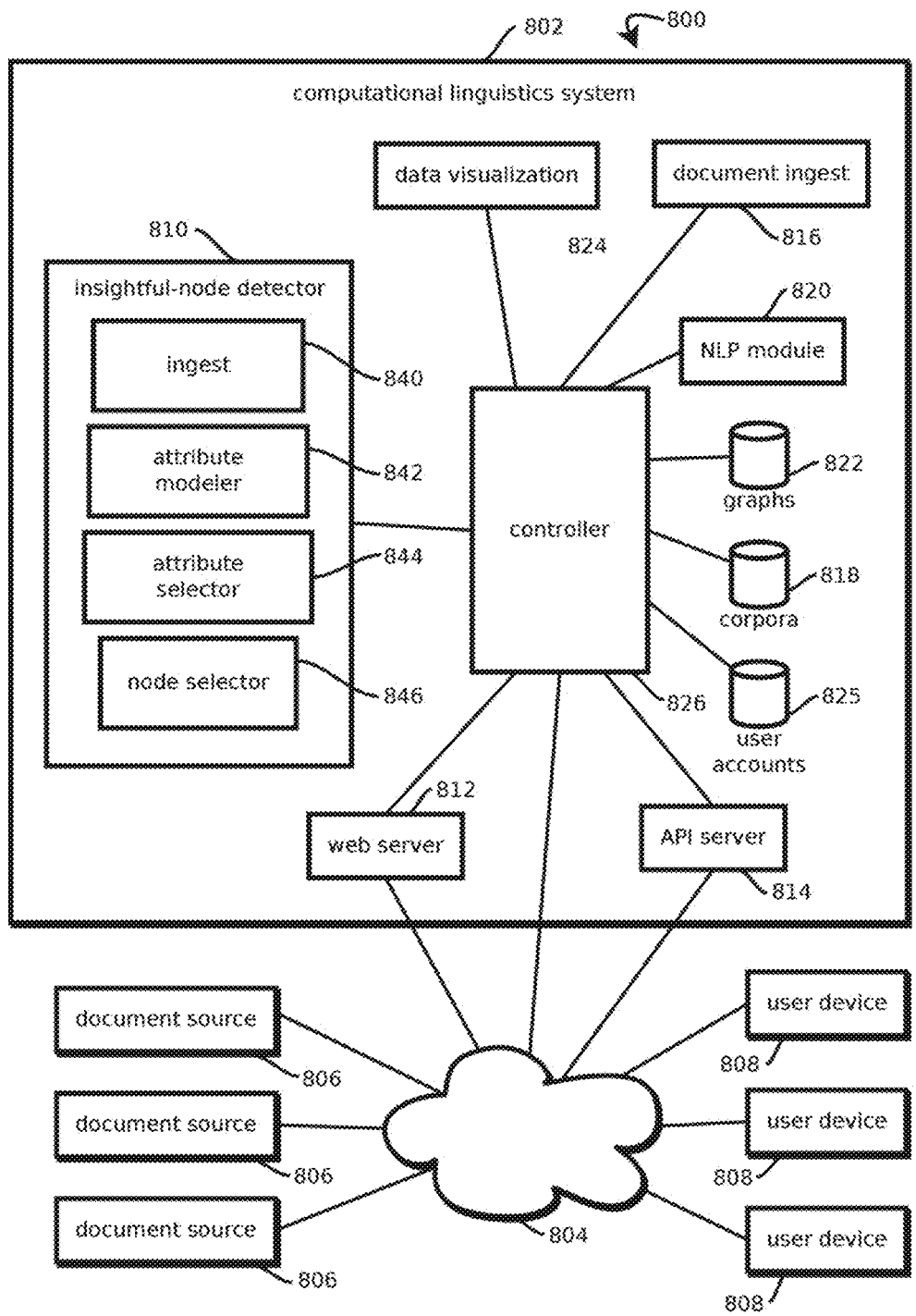
FIG. 3 illustrates an example of a computational linguistics system that may execute some embodiments of the processes of FIGS. 1 and 2, in accordance with some embodiments of the present techniques.

FIG. 3 illustrates, in block diagram form, the logical architecture of an example of a computing environment 800 in which the above-described techniques may be implemented. In some embodiments, many (and in some cases, most) queries and other analyses are expected to return information about relatively large collections of documents (e.g., more than 1,000, and in many cases, more than 10,000, or more than 100,000). This is the intended use case of some embodiments, which is distinct from many online search engines designed to designate the most relevant document. In view of this distinction, some embodiments of process the results and provide graphical user interfaces that facilitate insights on collections of responsive documents, rather than merely directing the user to individual documents. In many cases, users are more interested in what an entire field has to say about a particular topic, rather than finding, for instance, the most relevant individual document about some topic. Many traditional search engines are not well-suited for this type of analysis, as it is common for search engines to emphasize individual responsive documents rather than attempt to provide some synthesis of the collection of responsive documents. In contrast, some embodiments consistent with the present techniques may both help the user find the needle in the haystack, as well as develop an understanding of the haystack itself.

In some embodiments, environment 800 includes a computational linguistics system 802, the Internet 804, document sources 806, and a plurality of user devices 808, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may submit commands (like specifying corpora and topics) to the system 802 (which may be geographically remote) via a web browser executing on user devices 808 and exchanges over the Internet 804. In some embodiments, users may submit commands to view (or otherwise interrogate, e.g., search) trends, entity relationships, sentiment relationships, term relationships, or document relationships (e.g., graphs of such relationships) determined by the computational linguistics system 802 based on unstructured plain text documents. These documents, in some cases, may be retrieved (e.g., downloaded) from content hosted by third party document sources 806, in some cases as batch downloads in advance of queries.

In some embodiments, the computational linguistics system 802 may include an insightful-node detector 810 to perform the above-described techniques, a web server 812, an application-program interface (API) server 814, a document-ingest module 816, a corpora repository 818, a natural-language processing module 820, a graph repository 822, a data visualization module 824, a user-account repository 825, and a controller 826. The controller 826 may coordinate the described operations of the other modules. In some cases, prior to granting access, the controller 826 may confirm a user's credentials against a user account in the repository 825 for security purposes and to verify whether a user account is current, e.g., a subscription fee has been paid.

FIG. 3 includes an insightful-node detector 810 that in some embodiments performs the processes of FIGS. 1 and 2. In some embodiments, the insightful-node detector 810 includes an ingest module 840, and attribute modeler 842, and attribute selector 844, and a node selector 846. In some embodiments, the ingest module performs the operations of block 12 of FIG. 1. In some embodiments, the attribute modeler 842 performs the operations of blocks 24 through 34 of process 22 of FIG. 2. In some embodiments, the attribute selector 844 performs the operations of block 36 of FIG. 2. In some embodiments, the node selector 846 performs the operations of blocks 16 and 18 of process 10 of FIG. 1.

In some embodiments, system 802 may include a web server 812 and an application-program interface (API) server 814. These servers may listen to corresponding network ports, maintain session state for various sessions with user devices 808, advance requests and posted data to controller 826, and send responsive data to user devices 808. In some cases, responses may be in the form of web pages, like serialized bodies of markup language, cascading style sheets, and JavaScript™ instructions used by web browsers to render content, like inputs for making requests or data visualizations of query responses. In some embodiments, the API server 814 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferreds or promises.

In some embodiments, the document-ingest module 816 may obtain collections of documents and store those documents in corpora repository 818, which may have analyzed corpora of unstructured plain text documents used to generate the presently described graphs. In some embodiments, the documents may be obtained from different document sources 806, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing graph topologies is unstructured text, like human readable plain text in prose form with markup instructions and scripting language instructions removed. For instance, an automated web browser, like Selenium™, may be executed to retrieve web pages, execute scripts to and render markup language construct a document object model of the webpages, and parse visible text from the web pages that is retrievable from ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyzed documents according to their mode of construction or to weight terms according to their visual weight when rendered or annotate terms according to their context. In some embodiments, the text may be encoded as Unicode or ASCII text.

In some cases, an analyzed corpus may be relatively large, for example, more than 100 documents, more than 1,000 documents, or more than 10,000 documents, and connections indicating semantic similarity between the documents (or entities, sentiments, terms, or the like, as described below) may be relatively numerous, e.g., more than 5 connections on average between documents, like more than 50, more than 500, or between each unique pair of documents. In some embodiments, each of the documents may also include a substantial amount of text, for instance, more than 100 words, more than 500 words, or more than 2,000 words.

In some embodiments, an analyzed corpus used to construct a graph may be relatively large. For expected use cases of the present inventions, the corpus is larger than would be economically feasible for humans to manually perform the process 10 in reasonable amounts of time, and computers are required to implement the process 10 in commercially relevant intended applications. For example, the corpus may include more than 50 documents, like more than 500, or more than 5,000 documents. Further, in some embodiments, the documents within the corpus may be relatively long, for example, having a median length of more than 50 words, like more than 500 or more than 5,000 words, depending upon the use case.

The necessity of computer implementation, even for relatively small corpora, can arise from the number of documents, the length of documents, or the semantic pairwise interrelationships between the documents, which can give rise to data structures that can grow factorially with each additional document depending upon how aggressively semantic links between documents are pruned. Due to this scaling effect, each additional document in some applications can impose substantial additional computational and memory burdens, and increasing the number of documents even by a small amount can be a nontrivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, like scientific literature, medical literature, economic literature, psychological-research literature, and the like, for instance, from a given journal, university, country, or academic. Other examples include webpages, for example, from businesses, like the 500 highest ranking business entity web sites responsive to a given query, businesses within a given region, business in a given industry, businesses at a given state of development (like emerging businesses), or combinations thereof, like startups in Silicon Valley targeting the shipping industry to give one example. Other examples of corpora include documents hosted in government databases, like the full text patent database hosted by the United States Patent Office, regulatory filings with the Securities and Exchange Commission hosted in the Edgar database, court filings within the Pacer database, Federal Communication Commission filings, United States Food and Drug Administration filings, and the like. Another example of corpora includes various bodies of journalism, like catalogs of newspapers, magazines, and the like. Relevant corpora also include social media posts, for example, microblog posts, blog posts, posts within social networks, and the like, as well as resumes, job postings, and product manuals. Some embodiments may operate on corpa of unrelated documents, such as any corpus containing metadata that could be represented as discrete data points or ranges.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco Calif., or by performing latent semantic analysis or other distributional semantic techniques to construct the graphs described herein. In some cases, the analysis may be performed by an unsupervised machine learning technique, or some embodiments may train supervised machine learning models (e.g., with stochastic gradient descent) based on a training set, like text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, the natural-language processing module 820 may analyze these corpora and store resulting graphs in the graph repository 822, e.g., at query time or in advance, depending on acceptable latency and resources available, or in some cases partially in advance. In some cases, graphs like those described above may be obtained by subjecting a corpus to various types of distributional semantic analysis, e.g., statistical similarities measures like latent semantic analysis, random indexing, normalized Google™ distance, Best path Length On a Semantic Self-Organizing Map, Vector Generation of an Explicitly-defined Multidimensional Semantic Space, or other techniques by which the distribution of terms in documents is represented as relatively high-dimensional vectors, and semantic similarity is measured by according to similarity of the vectors, for instance, cosine similarity or Minkowski distance. The analysis technique used by some embodiments may be selected based on the type of relationships to be measured, e.g., between entities or terms, versus between larger units of language, like documents or paragraphs. In some cases, a corpus may be analyzed multiple ways, yielding graphs of relationships between entities mentioned in the documents as well as graphs of relationships between the documents.

Graphs need not be labeled as a "graph" in program code to constitute a graph. Other constructs may be used to the same ends and still constitute a graph. It is enough that the arrangement of information (e.g., in program state, storage, or both) contain the attributes of the presently described graphs to constitute a graph having edges and nodes. For example, in an object-oriented programming environment, documents may be mapped to "document" objects, and those objects may have an attribute of a list of semantically similar documents each of which corresponds to a different "document" object and has a similar list referencing other documents, regardless of whether this arrangement is referred to as a "graph" in code.

In some embodiments, to measure relationships between documents (or other larger language units, like paragraphs), each document may be represented by a feature vector in which each value of the vector indicates the presence, number of occurrences, or frequency of an n-gram in the document. N-grams are sequences of one or more terms, e.g., "the" is an example of an n-gram where n=1, "the quick" is another n-gram where n=2, and "the quick brown fox jumped" is another where n=5. In some cases, relatively uninformative terms, like stop words ("the," "a," and "an" being common examples), or terms detected with term-frequency inverse document frequency (TF-IDF) scoring may be omitted.

To calculate TF-IDF for a given n-gram, some embodiments may count the number of times the n-gram occurs within a given document and the number of other n-grams in the document before calculating a frequency with which the term occurs within the document. Some embodiments may also count the number of times the n-gram occurs in a larger collection of documents, such as the analyzed corpus of a sampling thereof, as well as the total number of terms in the larger collection of documents to calculate another frequency with which the term appears in the larger collection of documents. The two resulting frequencies may be compared, for instance, dividing one frequency by the other, to determine the TF-IDF score.

In some embodiments, a form of TF IDF may be calculated that suppresses the marginal effect of relatively high counts of n-grams within documents, for instance with a BM25 score. In some embodiments, the amount (e.g., count or frequency) of occurrences of the respective n-gram in a given document may occur both in a numerator and the denominator of a ratio with the amount of occurrences of the respective n-gram in the larger sample of other documents, for instance as a sum between these values in the denominator and the document-frequency in the numerator. In some embodiments, these values may have a derivative with respect to the amount of occurrences in the respective document that decreases in absolute value as the number of occurrences in the respective document increases, for instance monotonically or substantially monotonically. Thus, in some embodiments, the values may be proportionate or not proportionate to the amount of occurrences of the respective n-gram in the respective document. Suppressing the effect of higher occurrence amounts in the document at issue is expected to yield results closer to the user's intent, though embodiments are consistent with other (e.g., proportional) approaches.

Position of a value in the feature vector may correspond to one n-gram, e.g., the first position of a vector may correspond to the n-gram "jumped over," and documents containing this sequence of terms have a feature vector with value in the first position indicating that this term is present. Documents many be analyzed as a whole, or at higher resolution. For instance, in some embodiments, each document may be partitioned into paragraphs, and then, a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Because the universe of n-grams a document could contain is relatively large, and documents tend to use a relatively small portion of these n-grams, feature vectors tend to be relatively high-dimensional and sparse, having a value of zero for most values. To mitigate the burden of high-dimensionality, in some cases, feature vectors may be subjected by some embodiments to various types of dimensional reduction, like indexing, random indexing, or singular value decomposition.

In some cases, a corpus may be represented by arranging the feature vectors into a term-document matrix. For instance, each row or column may correspond to a document, and the values along the row or column may be the feature vector of that document. Thus, rows may represent documents, and columns n-gams, or vice versa.

Or in some embodiments, a document or corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entitles mentioned in documents, sentiments expressed in documents, or terminology in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for a larger datasets. A number of techniques may be used to expedite these operations and reduce memory consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cash memory to these ends.

In some cases, some of the sparse-matrices described above may consume a relatively large amount of memory using some traditional techniques. To conserve memory, some embodiments may compress the sparse matrices, for example, by decomposing a matrix into vectors, and translating the vectors into an index indicating which vector scalars have a nonzero value and corresponding indications of those values. Some embodiments may compress such vectors with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as eight, 16, or 32 bit binary values having a number of digits selected in view of an operating system, register size, memory bust size, and other hardware constraints of a computer system upon which the above processes are to be run to expedite operations and conserve memory.

Some embodiments may determine document similarity based on latent semantic analysis of unstructured text in the documents. For instance, some embodiments may create a term document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing with more than a threshold frequency in the documents may be determined and weighted according to TF-IDF. In some cases, the resulting weighted term document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (like within a threshold number of words in the text), or vice versa, and values represent presence, number, or frequency of instances in which corresponding terms are determined to be adjacent one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or −1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vectors may be determined for documents in a corpus. Some embodiments may execute a density-based clustering algorithm, like DBSCAN, to establish groups corresponding to the resulting clusters and exclude outliers. To cluster according to vectors, some embodiments may iterate through each of the vectors reflected in the records and designate a vector as a core location in vector space if at least a threshold number of the other vectors in the records are within a threshold distance in vector space. Some embodiments may then iterate through each of the vectors and create a graph of reachable vectors, where nodes on the graph are identified in response to non-core corresponding vectors being within a threshold distance of a core vector in the graph, and in response to core vector in the graph being reachable by other core vectors in the graph, where to vectors are reachable from one another if there is a path from one vector to the other vector where every link and the path is a core vector and is it within a threshold distance of one another. The set of nodes in each resulting graph, in some embodiments, may be designated as a cluster, and points excluded from the graphs may be designated as outliers that do not correspond to clusters.

In some cases, when performing these operations, movements within a memory hierarchy of a computer system (e.g., from storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive) may extend this trade-off even further. In some embodiments, matrices may be large enough that during operation substantial portions of the matrix, for example, most of the matrix, cannot fit into the higher levels of a memory hierarchy, and portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy, for example, the higher and lower levels may be level 2 cache and dynamic random access memory respectively or level 2 cache and level 3 cache respectively. In some cases, multiple levels of tiling may be performed, e.g., a tile loaded into cache may be sub-divided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

Some embodiments may learn a set of topics and n-grams pertaining to the respective topics, and label documents, collections of documents, and n-grams according to scores indicating a pertinence of the topic. In some embodiments, the number of topics may be relatively large, for example, more than 10 topics, and in many cases substantially more, like more than 50, more than 500, or more than 1,000 topics in relatively fine-grained analyses. In some embodiments, the topics may be arranged in a hierarchical taxonomy, for instance, with "health" at a top level, "heart health" and "lung health" at an intermediate level, and "heart attacks" and "hypertension" at a lower level of the former. In some embodiments, the topics may be labeled topics in the sense that each topic has a term that refers to the concept or set of concepts to which the topic pertains, like the topic name "health." In other embodiments, the topics are unlabeled, for instance, corresponding to a collection of concepts or a concept that are inferred to be distinct from other collections of concepts, but these concepts or collections of concepts may be unnamed (e.g., after topics are identified but before topics are labeled) beyond merely being recognized as distinct by some embodiments. For example, some unsupervised learning techniques may group or score keywords according to a specified number of topics, without labeling each of those topics.

In some embodiments, each topic may be associated with a set of n-grams, such as one, two, three, four or more consecutive words appearing in natural language text. For example, the phrase "quick brown fox jumped over the lazy dog" includes bi-grams of "quick brown," "brown fox," "fox jumped," and so on, as well as tri-grams like "quick brown fox," "brown fox jumped," and so on. Some embodiments may include n-grams up to some threshold, like 1 (for keywords), 2, 3, 4, or 5. In some embodiments, the n-grams may be obtained from the text of a set of documents for extracting topics. In some embodiments, the set of documents may be the corpus obtained, a subset of the corpus (e.g., a random sample deemed large enough to yield statistically significant results while expediting processing), an overlap with the corpus, or a different set of documents. In some embodiments, the n-grams may be each unique n-gram present in the set of documents, in some cases excluding stop words.

In some embodiments, each topic may have a topic-specific score associated with each of these n-grams, for instance, in the form of a topic vector, where dimensions of the vector corresponds to each of the topics, and where values of each of the dimensions indicate an amount by which the corresponding n-gram is predictive of the corresponding topic. For example, a topic vector for the topic of "basketball" may include a dimension corresponding to the n-gram of "backboard" and that n-gram's dimension in the vector may have a score of 0.95 indicating a relatively strong predictive value for inferring that the n-gram refers to the topic of "basketball." The same topic vector may include another dimension corresponding to the n-gram of "court," and the n-gram may have a score of 0.3, illustrating a much weaker predictive value, for instance, due to this n-gram being used in association with many other topics, like a court of law. Similarly, the same set of topics may include the topic of "law," and the n-gram of "court" may have a score for this topic that is higher, for instance 0.6, indicating that the conditional probability of "law" being exhibited when the n-gram of "court" is observed is higher than the conditional probability of "basketball" being exhibited when the same n-gram is observed.

Encoding the topic-specific scores of the n-grams in the form of a topic vector is expected to consume less memory than systems that explicitly record key-value pairs for each topic and each n-gram and reduce the amount of data shifted up and down a memory hierarchy in a computer system or between computer systems, thereby yielding faster computations, though embodiments are also consistent with these slower approaches. Some embodiments may encode the topic vectors as tuples. In some cases these scores, and the other scores described herein, may be encoded as binary values of some length selected based on a specification of an operating system or a central processing unit (CPU), such as an 8-bit value, a 32-bit value, or a 64-bit value, each corresponding to, for instance, an address space size of an operating system, a number of registers in a CPU, or a unit of memory that moves as a block between one level of memory hierarchy and another.

In some embodiments, to conserve memory, the set of n-grams associated with each topic may be pruned. For example, in some cases, n-grams having a topic-specific score that does not satisfy a threshold, for instance, is less than a threshold value (e.g., 0.7), may be omitted from the set of n-grams corresponding to the respective topic. In some cases, the correspondence of n-grams after pruning to topics may be indicated with a binary value of zero or one in a topic vector, with dimensions that satisfy the threshold being designated with a 1 and dimensions that do not being designated by a 0. In some cases these topic vectors are expected to be relatively sparse, and some of the techniques described below for expediting computing operations with sparse vectors may be employed to expedite computations.

In some cases, the topics, the set of n-grams, and the scores for those n-grams may be explicitly provided as an input, for instance, by a user configuring the system with hand-coded topic data. However, in many cases, users are seeking document relationship graphs because the users are seeking an understanding of a relatively large corpus and the topics therein. In many of these use cases, the user will not have on hand a defined topic set, nor will it be feasible for a user to accurately specify a topic set well calibrated for interrogating the corpus of documents.

In some embodiments, the set of topics, the set of n-grams corresponding to those topics, and topic specific scores for each of those n-grams may be inferred from a set of documents, like the corpus itself, a set with overlap with the corpus, or a different set of documents. In some cases, supervised learning may yield such a data set. For example, in some embodiments, a user may supply a training set of documents in which the documents have been labeled with the topics exhibited by the respective documents. In some embodiments, the labeling is relatively granular, with multiple topics appearing in the documents, and subsets of the documents labeled as pertaining to particular topics. For example, such labels may indicate a range of words in the document by word count, for instance, with a start word count and an end word count, and this range may be associated with an identifier of a topic and a score indicating a pertinence of the topic to the range of text (e.g., from 0 to 1). In other cases, the labeling may be less granular, and a single topic label may be applied to an entire document, or a collection of topic labels may be applied to an entire document, in some cases with a binary indication, or in other cases with a cardinal score indicating a pertinence of the respective topics to the respective document.

Based on this training set, for each topic, some embodiments may learn topic-specific scores for each n-gram, the scores indicating an amount that the corresponding n-gram predicts the corresponding topic. A variety of different techniques may be used to learn these topic-specific scores. In some embodiments, the result of learning may be a topic model (e.g., a mapping of topics to a set of n-grams, each n-gram having a topic-specific score indicating a conditional probability of the respective topic being exhibited upon observing the respective n-gram in a document) having parameters that indicate the topic-specific scores. In some embodiments, the topic model may be formed by arbitrarily assigning topic-specific scores to the n-grams, for instance by randomly, like pseudo-randomly, assigning such scores. Next, some embodiments may iteratively determine whether the model parameters agree with the labels in the training set and adjust the model parameters to increase an amount of agreement (or determine whether the model parameters disagree and adjust the model parameters to reduce an amount of disagreement). In some cases, these iterations may continue until an amount of change between iterations is less than a threshold or a threshold number of iterations have occurred. For instance, some embodiments may adjust the model parameters according to a stochastic gradient descent. In some embodiments, the topic-specific scores are determined with supervise learning, based on the training set, with a support vector machine. In some embodiments, the topic-specific scores are determined with supervise learning, based on the training set, with a Bayesian topic model.

In some embodiments, the topic-specific scores may be determined with unsupervised learning. In some cases, it can be relatively expensive and time-consuming to obtain the training set, or the available training sets may not be known to have the appropriate type of subject matter to yield topics relevant to the corpus at issue. In such scenarios, unsupervised learning may yield the set of topics, n-grams pertaining to the topics, and corresponding topic-specific scores without requiring a training set be provided.

Some embodiments may ascertain topics in documents, sets of n-grams (e.g., keywords, or bi-grams or tri-grams) pertaining to each topic, a score for each n-gram for each topic indicating how predictive the respective n-gram is of the topic, and an score for each topic for each document indicating an amount the topic is exhibited by the document. Some embodiments may perform this analysis with an unsupervised learning technique, e.g., without incurring the cost of obtaining a manually labeled training set of documents where humans tag text as pertaining to topics or supply topic-n-gram correspondence values.

For instance, some embodiments may execute a form of Latent Dirichlet Allocation. In some cases, a number of topics to be ascertained may be supplied, e.g., by a user indicating that 2, 3, 5, or 50 topics are to be ascertained. Next, some embodiments may arbitrarily (e.g., randomly, like pseudo-randomly) designate each n-gram in each document as pertaining to one of the topics. Then, some embodiments may iteratively adjust the designations to make n-grams that, within the set of documents, tend to co-occur in a document more likely to be designated with the same topic.

For example, some embodiments may, for each document, for each n-gram in the respective document, for each topic, determine 1) an amount (e.g., proportion relative to a total number of n-grams of the same length) of n-grams in the respective document designated as pertaining to the respective topic, and 2) an amount (e.g., proportion relative to all documents) of all instances of n-grams (e.g., of the same length as the respective n-gram) in all of the documents designating as pertaining to the respective topic. And then for the respective document and n-gram, some embodiments re-designate the respective n-gram as pertaining to a topic selected according to a probability of the topics.

The probability of the topics may be 1) the conditional probability of the respective topic being exhibited given the respective document multiplied by 2) the conditional probability of the respective n-gram occurring given that the respective topic is exhibited (as indicated by the current distribution of assignments). In some embodiments, this operation may be repeated until the designations converge, e.g., until less than a threshold amount of designations change, or a sum or measure of central tendency of the second conditional probability changes by less than a threshold amount, or until a threshold number of iterations have occurred.

In some embodiments, for larger document sets, or larger documents, the operations may be relatively computationally complex and resource intensive. Accordingly, some embodiments may perform the analysis in a distributed computing framework, like Apache Hadoop or Spark, e.g., with documents or portions of documents being assigned to different nodes (e.g., computing devices or threads), and each node determining document-specific values (e.g., counts of n-grams or topic-pertinence, etc.), before the document-specific values are aggregated, e.g., to determine conditional probabilities for a population of documents. In some cases, some tasks may be assigned to nodes by document (e.g., sending each node a subset of documents), while other tasks may be assigned to nodes by topic (e.g., sending each node a subset of topics). In some cases, the number of nodes may be relatively large, e.g., exceeding 10, or 100 nodes. Sending instructions to the distributed data, rather than moving data between computing devices where instructions are static, is expected to yield faster results for particularly large data sets. Or some embodiments may perform these operations in a single thread or a single computing device.

Some embodiments may account for changes in topic associations with n-grams over time. In some cases, a plurality of sets of n-grams pertaining to a given topic may be determined, with each instance in the plurality being determined based on a different set of documents, each set of documents being associated with a duration of time, such as continuous ranges of time, like by year. In some cases, a user may select a particular time range for a particular topic or set of topics, and the corresponding time-range specific topic vectors may be selected for subsequent processing.

Some embodiments may learn multiple sets of topics, with each instance corresponding to a different granularity of topics. For instance, some embodiments may execute one of the above-described unsupervised techniques for learning a topic model with a first number of topics, like five, to yield a first set of topics and n-grams pertaining to the respective topics, and then execute the same technique with a different number of topics, like 50, to yield a second set of topics and n-grams pertaining to those respective topics, with greater granularity. Some embodiments may provide a user interface by which a user may select a granularity before selecting a topic, and corresponding topic vectors may be determined in response to the user selection.

In some embodiments, whether the topics and associated values are obtained with supervise learning, unsupervised learning, or explicitly provided, each topic may be specified by a topic vector, and the collection of topic vectors may form a topic matrix, with one dimension corresponding to topics (e.g., columns of the matrix), another dimension corresponding to n-grams (e.g., rows of the matrix, or vice versa). In some embodiments, the topic-specific scores may be normalized across topics. For instance, some n-grams may be relatively common generally and have a high correspondence with each of the topics, in which case, some embodiments may reduce an amount by which the corresponding n-grams are indicated to predict the topics relative to n-grams that have relatively isolated correspondence to relatively few topics. In some cases, such normalization may emerge in the process of learning topic-specific scores, or some embodiments may impose such normalization, for instance, by dividing each topic-specific score for each n-gram with the sum of topic-specific scores for the respective n-gram across all of the topics. In some cases, visualizations may reflect topics associated with corresponding elements.

In some embodiments, the data visualization module 824 may be operative to prepare data visualizations for display on user devices, e.g., visualizations of the graphs described herein. In some cases, such visualizations may include physics-based arrangements of nodes within a display, like a force-directed layout. In some cases, graph generation and visualization preparation takes place on system 802, and resulting interactive visualizations run (e.g., entirely) in a web browser of a user device. In some cases, this entails displaying and manipulating thousands of vertices and edges in an environment on user devices not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

Graphs of real-world information are often relatively intricate. In some embodiments, visualizations may support real-time (e.g., in this context, with less than 500 ms latency) interactions with relatively large numbers of interactive objects, e.g., more than 500, like more than 1,000, and in some cases as many as 20,000 interactive objects with near zero latency. In some embodiments, this speed is accomplished by pre-processing physics models of graph layouts with a graphical processing units (GPUs) of the system 802, to reduce the computational burden on less powerful CPUs executing browsers on user devices. In some cases, displays may be relatively high dimensional, e.g., various visual attributes, like line weight, icon size, color, transparency, drop shadow offsets, or properties of physical models, like inertia, friction, attractive forces, repulsive forces, momentum, frequency of oscillation, and the like, may be mapped to different dimensions like those discussed above, e.g., similarity, relatedness, sentiment, and the like. Connections tend to be more relatively complicated and irregular, and embodiments often do not determine the visual shape of the graph ahead of time. Indeed, graph isomorphism provides for a relatively large number of visual arrangements of otherwise identical graphs, but many arrangements are relatively un-informative and difficult to visually parse to a human user consuming the resultant data.

To visualize graph relations, some embodiments of module 824 may arrange vertices (also referred to as nodes) and edges using a physics simulation that mimics the stretching of spider webs. Some spider-web-inspired representations may model interactions between each pair of vertices as a Coulomb-like repulsion and an additional Hooke-like attraction in the presence of an edge between the pair. A relatively weak gravitation-like force may be modeled to prevent separate components and isolated vertices from venturing too far from the network's center of mass. Thus, some embodiments may use this physics-based network layout. In some cases, the parameters and initial conditions of the physics based model may be determined by module 824, and instructions for executing the model and adjusting the model based on user input may be sent to the user device, e.g., in the form of JavaScript™ instructions that model, for instance, a user selecting and dragging a node as a force applied to the physics model. Embodiments are expected to appear relatively natural, and the hierarchy of a network's structure is expected to be readily apparent; both small and large network structures are exposed, which is expect to allow users to study relationships between groups of vertices on different scales.

Running a physics simulation in a user's browser can easily exceed the available computing resources, as the simulation can be inherently resource-intensive for larger, highly connected data sets. To mitigate this issue, some embodiments may exploit phenomena expected to arise as the size of the data scales. It is expected that, in some embodiments, the number of time steps consumed to achieve equilibrium starting with a random configuration of vertices scales linearly with the number of vertices. That is undesirable for presentation purposes (though some embodiments are consistent with this approach, particularly for smaller data sets). To mitigate this, some embodiments may arrange for initial conditions of the simulation so the equilibrium is attained faster.

To select initial conditions of the physics-based animation of this n-body system, some embodiments may perform a gradient descent optimization. Some embodiments may compute the gradient of the modeled system's energy (e.g., based on the forces affecting nodes), integrate that to compute momentum, and move the particles in the simulation representing nodes accordingly. Initial conditions of the gradient descent may be selected strategically in some cases to mitigate the effects of local minima in what is expected to be a relatively rough energy landscape (though embodiments are also consistent with random selection of initial conditions, like with a stochastic gradient descent). For instance, some embodiments may seed the simulation with a vertex configuration that is in the vicinity of the final destination. To this end, some embodiments may execute a discretized version of the problem and search through all vertex configurations on a 2D grid.

This process is still of combinatorial complexity, however, and may be generally too expensive for some larger graphs. To mitigate this issue further some embodiments may simplify the search space to one dimension with space filling curves, like a z-curve or Hilbert curve that cover a 2D region of space with a one-dimensional curve. Such space-filling curves may be constructed via an iterative process, whereby at each step of the iteration the curve is refined at ever-finer scales. By ceasing iterations at a finite step, some embodiments may obtain a curve with just enough points to accommodate the data at issue. Further benefits, in some embodiments may arise from the property of some space filling curves: the 2D distance between any pair of vertices is well-approximated by (the square root of) the distance along the curve. In this scenario, in some embodiments, the problem of finding an approximate 2D layout is equivalent to finding an energy-optimal linear ordering of vertices, which some embodiments may use to implement less computationally intensive heuristics, circumventing the initial combinatorial complexity. That said, not all embodiments provide this benefit, as the various inventions described herein are independently useful.

As noted above, some embodiments may be configured to generate graphic visualizations that provide both detailed information about interesting local features of graphs as well as information about the larger structure, in some cases, concurrently in a single view. Some embodiments may concurrently provide a global view while concurrently surfacing interesting fine-grained features of the data structure. In some embodiments, a process 400 illustrated in FIG. 4 may generate a graphic visualization 500 shown in FIGS. 5A and 5B. As explained, this process and the graphic visualization that results are expected to facilitate new insights on large data sets that would otherwise be difficult to analyze, and in some cases, these visualizations may be formed with computational techniques that reduce latency relatively to more naïve approaches, particularly for large data sets (though some embodiments are also consistent with slower forms of generating the graph).

In some cases, different operations of the process 400 may be performed on different computing devices in a distributed computing architecture, e.g., like that in FIG. 3. For instance, in some cases, server-side operations may obtain the graph and pre-calculate initial positions and visual attributes of a visualization, or in some cases, these visual attributes be determined client-side. Similarly, in some embodiments, adjustments to the graph may be partially or entirely performed client-side or server-side. In some cases, instructions for all operations may be stored server-side, and some of those instructions may be sent to a client, e.g., in the form of a webpage having scripting commands, to have some operations performed remotely.

In some embodiments, the process 400 includes obtaining a clustered graph, as indicated by block 402. In some cases, the cluster graph may be a clustered graph obtained with the techniques described above, for example, with a computational linguistics system like that described with reference to FIG. 3. Or, some embodiments may obtain a graph through other techniques, like querying a relational database for a collection of items and information about relationships there between. Query results may be clustered with the graph-clustering algorithms described above. In some cases, the clustered graph may include a relatively large number of clusters, like 10 or more, 15 or more, or 100 or more, and each of the clusters may include a relatively large number of nodes associated with that cluster, like more than 5, more than 50, more than 500, or more than 5000 in many commercially relevant use cases.

Next, some embodiments may determine visual attributes of cluster icons based on amounts of nodes in the clusters, as indicated by block 404. The cluster icons may be various types of visual elements, such as shapes occupying an area of a display screen, like circles (as is shown in FIGS. 5A and 5B), polygons, (like squares, triangles, octagons and the like), irregular shapes (like a convex hull of the nodes). In some cases, the cluster icons may be volumes, for example volumes rendered in a virtual reality or augmented reality in a headmounted display.

In some embodiments, the visual attributes may be varied based on the amount of nodes in the respective cluster with a variety of different relationships. In some embodiments, the area of the cluster icon may correspond to the amount. In some embodiments, a single spatial dimension may correspond to the amount like a radius or width. In some embodiments, the visual attributes may be a color of the cluster icon, an attribute of a gradient of the cluster icon, a transparency of the cluster icon, a luminosity of the cluster icon, a drop shadow of the cluster icon, or an attribute of an on-screen vibration of the cluster icon. In some cases, a shape of the cluster icon may be varied according to these values, e.g., a number of sides of a polygon, or an angle of an arc or gauge.

In some cases, the visual attribute may be based on the amount of nodes directly and proportionately, for example, as the product of a scaling coefficient and the number of nodes. In some embodiments, the number of nodes may be normalized among the clusters to render a proportionate display. For example, some embodiments may determine a range of the amount of nodes among the clusters, and some embodiments may divide the number of nodes in an individual cluster by that range, before multiplying by a scaling coefficient to make the cluster icons relatively proportionate within a field-of-view. In some embodiments, the visual attribute may correspond disproportionately to the amount of nodes in the clusters. For example, some embodiments may determine the visual attribute as an exponent or log of the amount of nodes, for instance, in embodiments in which the amount of nodes varies relatively widely among the clusters. Some embodiments may cap the scaling at more than a threshold amount, like more than three standard deviations from a mean. The visual attribute may be a non-position visual attribute different from a position of the cluster icon in a graphical visualization, as the position may be reserved to indicate select relationships between various icons, in some embodiments. Or some embodiments may also indicate such attributes with position, e.g., with certain relationships indicated with non-position visual attributes.

In some embodiments, multiple visual attributes of the cluster icon may be determined based on multiple attributes of the nodes in the cluster. For example, some embodiments may vary a visual attribute (like color) based on a topic score for documents within the cluster, or some embodiments may vary a visual attribute based on an amount of times on average documents within the cluster are shared in a social network. In another example, some embodiments may vary a visual attribute based on a sentiment expressed on average among the documents in a cluster. In some cases, the two, three, five or more visual attributes, such as those above, may be varied according to these measures. In some embodiments, the set of cluster icons may each be associated with a respective set of visual attributes, for instance identifying individual visual attributes with a unique identifier and indicating a magnitude or configuration of the visual attribute in a parameter space of the visual attribute.

Next, some embodiments may proceed by determining positions of the cluster icons in a graphical visualization of the cluster graph, as indicated by block 406. In some cases, the positions may be positions in a two-dimensional space, like within a range of horizontal and vertical pixels in a window of a browser, e.g., ranges spanning more than 50% of the height and width of a screen, with relatively fine-grained positioning through the ranges.

In some embodiments, the positions may indicate relationships between the clusters. For example, clusters having nodes that connect to nodes in another cluster with greater than a threshold frequency, greater than a threshold average weight, or some combination thereof may be positioned closer to one another than clusters lacking these relationships. Some embodiments may position the nodes around the cluster based on an attribute of the data. For example, some embodiments may place the oldest node in at 12 o'clock position and then the youngest at the 11:59 position. In some cases, the strength of such relationships may be characterized as an edge weight between the cluster icons, and some embodiments may depict those edges having greater than a threshold weight in the graphical visualization. These cluster edges may be different from (though in some cases based on) the edges between nodes.

In some embodiments, determining positions of the cluster icons may include executing a simulation of a physical system. For example, some embodiments may position the cluster icons according to a force directed graph layout. In some embodiments, the cluster icons may be modeled as applying forces to one another, in some cases with those forces varying as a function of the distance between the cluster icons in the graphical visualization, and in some cases with the magnitude of those forces varying according to relationships between the cluster icons, like those described above. In some embodiments, each iteration of the simulation may include determining updated positions and forces between each pairwise combination of the cluster icons. Some embodiments may execute the simulation through a number of iterations until an energy state less than a threshold is obtained or until a threshold amount of iterations have occurred. In some embodiments, the movement of the icons may be modeled as having an inertia, a friction, or some dampening factor to suppress oscillations in the simulation. In some embodiments, initial positions may be determined randomly, or according to the techniques described above, and the simulation may be executed until a termination condition, like those just mentioned, is achieved.

Some embodiments may render animated movements of the varying positions of the cluster icons through the simulation to display to the user the movement of the cluster icons into their final position. This is expected to convey information about the relationships of the icons indicated by directions of movement, velocities of movement, and acceleration of movement, though not all embodiments afford this benefit, which is not to imply that any other feature may not also be omitted in some embodiments. In some embodiments, this operation may be relatively computationally complex, particularly for large sets of clusters, and in some cases, may constitute a combinatorial optimization problem that may be relatively difficult for a low-powered computing device to execute in keeping with user expectations for latency and smooth animations. In some embodiments, the combinatorial optimization problem's solution may be only approximated to expedite operations. In some embodiments, sequences of positions for each cluster icon between a starting state and a resting state may be determined in advance, for example based on the computational linguistics system described above, before the sequences of positions are sent to a client device to expedite certain aspects of animations.

Some embodiments may include obtaining, for each cluster, a respective subset of nodes in the respective cluster, as indicated by block 408. In some cases, this may include performing the techniques described above with reference to FIGS. 1 and 2. In some embodiments, the subset of nodes may be selected based on various attributes of the nodes, like an amount of social sharing, an amount of times the document was republished, an amount of times comments were provided about the document, whether the node contains natural language text bridging between topics addressed (like in the aggregate, in a given cluster, or between clusters), an average user review or rating of a product, or an amount invested in a business or other business metrics. In some cases, the subset may be selected in virtue of the subset being representative of the cluster in terms of these attributes (or interactions thereof) or in virtue of the subset being anomalous in such terms.

Some embodiments may include determining visual attributes of node icons based on attributes of the corresponding nodes in the subset of nodes, as indicated by block 410. In some cases, the visual attributes of the node icons may be selected from among the same examples of visual attributes described above with reference to block 404. In some embodiments, the node icons may have different visual attributes selected than the visual attributes selected for the cluster icons, or the visual attributes may be the same. The node icons may be selected from among any of the above-describe examples of such icons for the cluster icons, and in some cases, the same type of icon or different types of icons may be selected for these different items. Similarly, the correspondence between attributes of the nodes and the visual attribute may be determined according to the various techniques described above, and a may include normalizing attributes, scaling attribute proportionately, capping outliers, or scaling visual attributes disproportionately to the node attributes.

Next, some embodiments may proceed by determining positions of the node icons in the graphical visualization based on the positions of the corresponding cluster icons, as indicated by block 412. In some embodiments, this may include determining such positions as part of the physical simulation described above, or as a separate second physical simulation performed after the first physical simulation, for example, to avoid scaling the above-described combinatorial optimization problems. In some embodiments, the node icons may be modeled as objects having an attractive force to the corresponding cluster icon, and in some cases a repellent force relative to one another. In some cases, these forces may decrease proportionately based on distance, based on the square of distance, or based on the cube of distance in the graphical visualization. In some cases, the forces modeled from relationships between the cluster icons may decrease with the square of distance, while the forces for the node icons relative to one another may decrease with the cube of distance, to facilitate tighter packing.

In some embodiments, different types of node icons may positioned differently relative to graphical elements linking between the clusters, for example depending upon whether the node icons correspond to edge properties or attributes that are unrelated to edges. In some embodiments, the node icons corresponding to edge properties may be positioned on the edge between clusters corresponding to those edge properties. In some embodiments, where links between clusters arise from similar topics addressed in both clusters, nodes that score relatively highly in the similar topics may be positioned on graphical elements corresponding to those links.

Next, some embodiments may proceed by causing the graphical visualization to be displayed, as indicated by block 414. This may include sending instructions to a remote client device to present the display, for example in a web browser, like in a canvas element. Or causing the graphical visualization to be displayed may include receiving and rendering such instructions.

In some embodiments, the graphical visualization may include various user inputs, in some cases corresponding to areas of the graphical visualization occupied by icons and corresponding event handlers that effectuate various transformations on the graphical visualization and underlying clustered graph or access particular information associated with the items represented by the icons.

In some embodiments, the graphical visualization is configured to receive user inputs to select icons, as indicated by block 416, such as cluster icons or node icons. In some embodiments, the selection may include touching, clicking on, hovering over, or in a augmented reality or virtual reality environment, looking at for more than a threshold amount of time, a particular icon. Some embodiments may include an event handler that receives an event according to the selection, and execute a responsive routine. In some embodiments, this may include accessing information about the selected icon, as indicated by block 418. In some embodiments, this may include retrieving text of a document corresponding to an icon node, retrieving aggregate statistics about nodes in a cluster, or the like. Some embodiments may proceed by determining an updated graphical visualization as indicated by block 420. In some cases this may include displaying a pop up or overlay graphical display that contains the accessed information. As a result, some users may drill down into particular pieces of information determined to be of interest based on the graphical visualization relatively quickly.

Some embodiments may include receiving user inputs to merge clusters indicated by block 422. In some cases, this input may include dragging one cluster icon across the graphical visualization to a location in the visualization's field-of-view occupied by another icon and dropping the dragged cluster icon on another cluster icon to indicate that the two corresponding clusters are to be merged.

Some embodiments may include a corresponding event handler configured to cause the underlying clusters corresponding to the two cluster icons to be combined, as indicated by block 424. In some embodiments, combining the clusters may include re-determining which nodes within the resulting cluster constitute representative nodes, anomalous nodes, or otherwise interesting nodes, and some embodiments may generate a new set of node icons corresponding to those newly identified subset of nodes, in some cases ceasing to display some of the subset of nodes that were previously displayed. After combining the clusters, some embodiments may proceed by determining an updated graphical visualization as indicated by block 420 and causing that graphical visualization to be displayed as indicated by block 414.

Some embodiments may include receiving user inputs to break-up clusters, as indicated by block 426. In some embodiments, this may include a user selecting a cluster in a different way, for example, by right clicking on the cluster, and selecting a menu option indicating that the cluster should be broken up. Some embodiments may include a corresponding event handler that execute a routine the cause the cluster to be subdivided, as indicated by block 428. Clusters may be broken up with a variety of techniques. Some embodiments may identify a dominant topic of the cluster and down weight cooccurrence instances of n-grams corresponding to that topic, before re-determining an adjacency matrix for the documents corresponding to the selected cluster being disrupted. Some embodiments may identify a dominant attribute of the nodes that caused nodes to be grouped in a cluster, and down weight that dominant attribute before redetermining clusters. Some embodiments may adjust locally parameters of a clustering algorithm, such as thresholds by which groups of nodes are determined to be in one cluster or another to subdivide the clusters, applying different thresholds to nodes in the cluster being divided than are applied to nodes in unselected clusters.

In some embodiments, an updated graphical visualization may be determined based on the resulting subdivided clusters, as indicated by block 420. Block 420 may include performing the operations described above with reference to blocks 404 through 412 for the newly added clusters or otherwise adjusted clusters. Finally, some embodiments may cause the resulting updated graphical visualization to be displayed as indicated by block 414.

Figure 4:
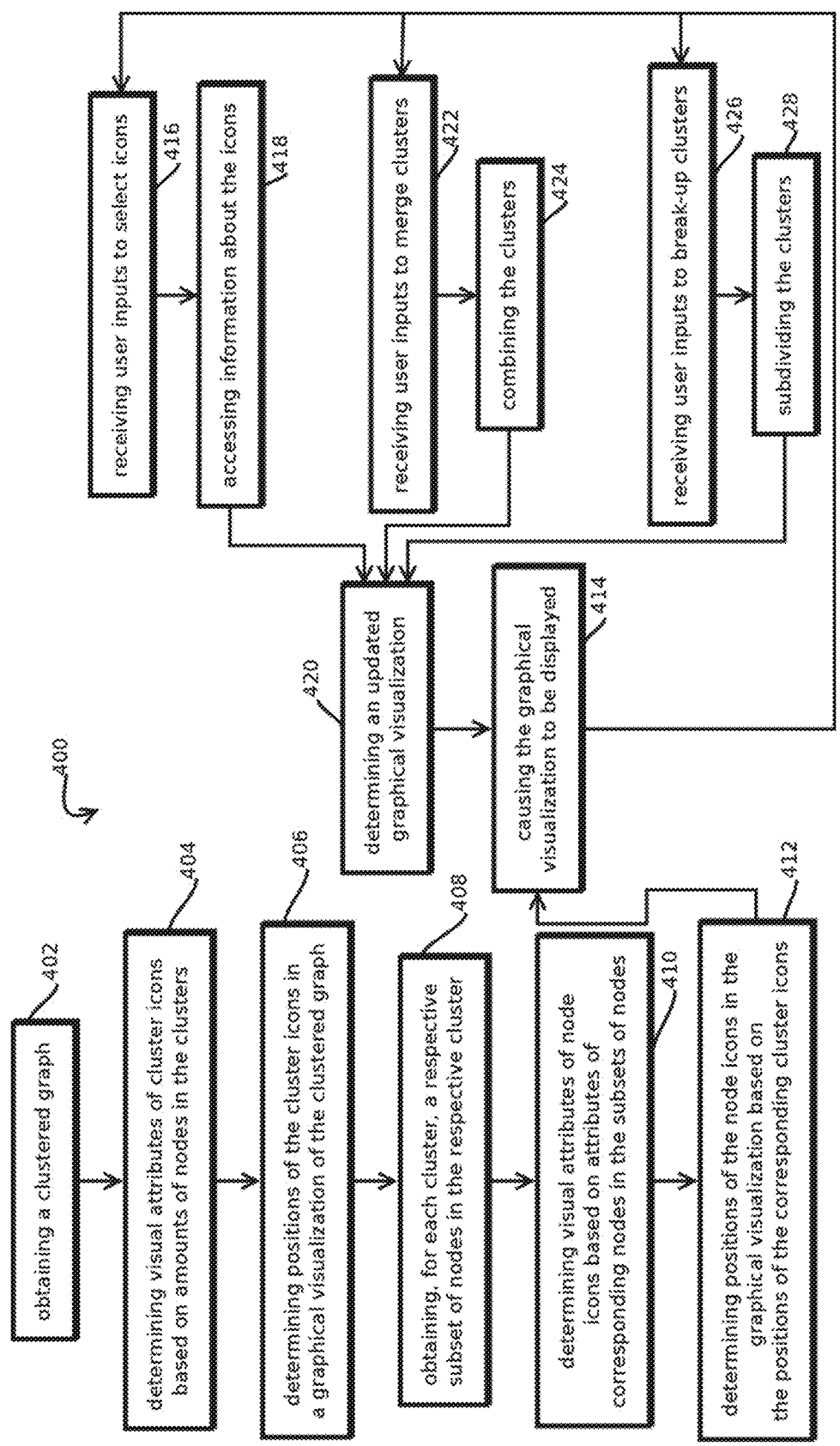
FIG. 4 illustrates an example of a process by which graphical visualizations of graph data structures may be formed and updated, in accordance with some embodiments of the present techniques.
Figure 5A:
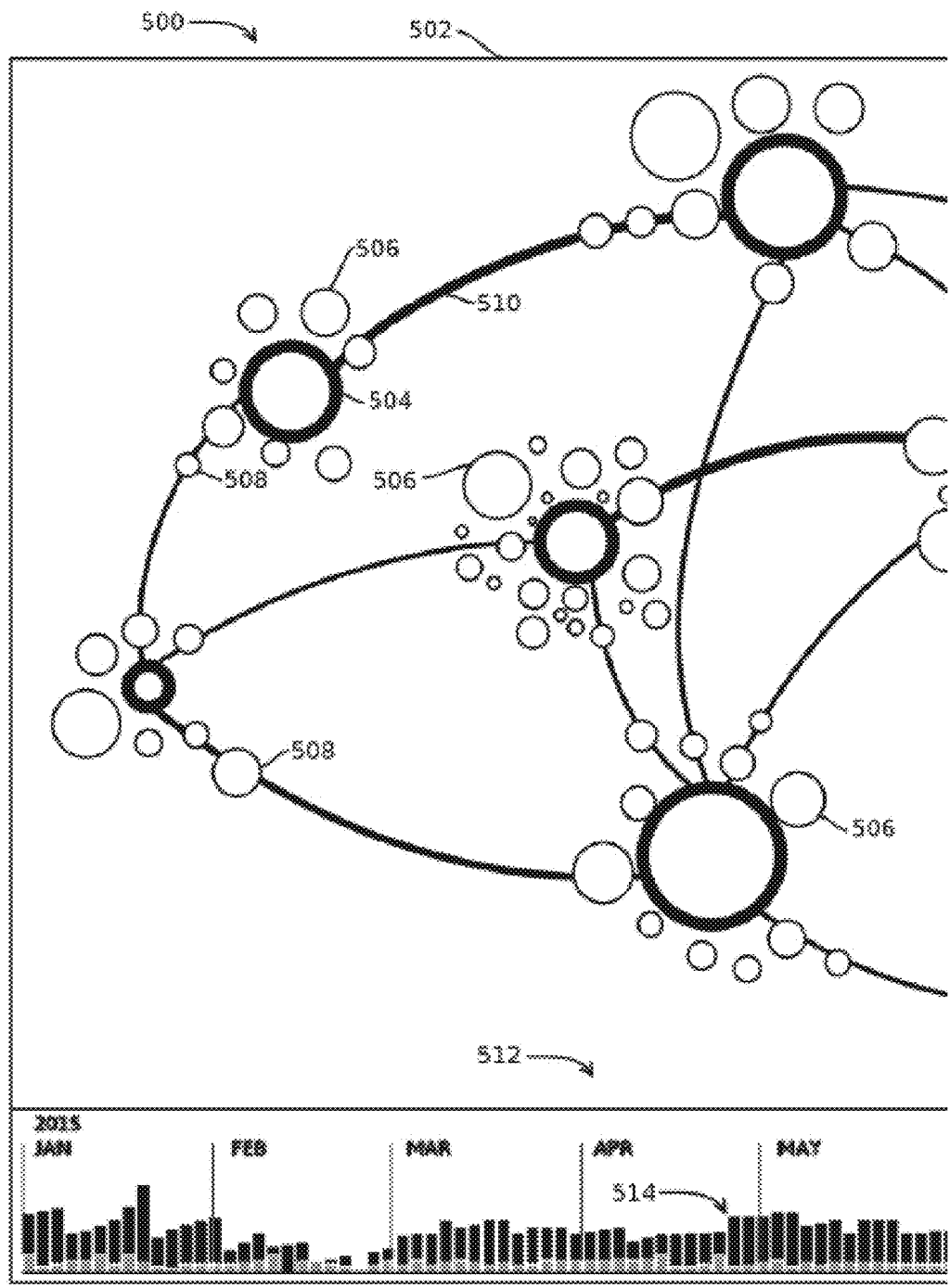
FIGS. 5A and 5B, are left and right half views, respectively, that together illustrates an example of a graphical representation of a graph produced by the processes and systems of FIGS. 1-4, in accordance with some embodiments of the present techniques.
Figure 5B:
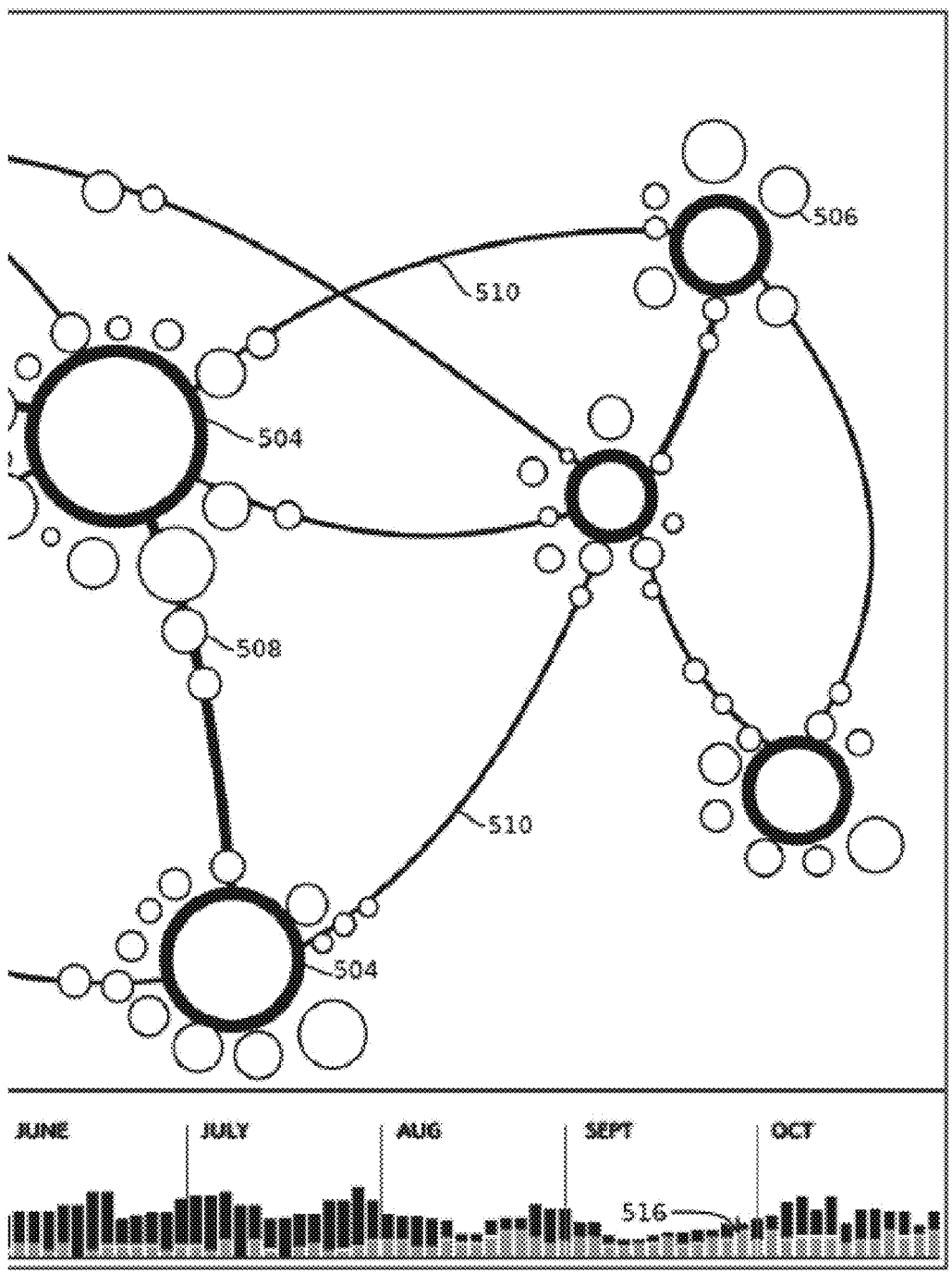

FIGS. 5A and 5B illustrates an example of a graphical visualization 500 that may be produced with the process of FIG. 4. FIGS. 5A and 5B illustrates a visual representation 500 within a field-of-view 502. In some embodiments, the field-of-view 502 may be a field-of-view in a web browser of a client computing device, or the field-of-view may be a direction in which a user is looking in a virtual-reality or augmented reality display resulting in a rendered display. In some embodiments, the field-of-view 502 includes a plurality of cluster icons 504 surrounded by node icons 506 and 508. In some embodiments, the node icons 506 and 508 may be nodes deemed significant according to the techniques described above for the respective cluster.

In some embodiments, each cluster icon 504 may represent a corresponding cluster in the underlying graph being visualized. In some embodiments, a visual attributes of the cluster icon 504 may correspond to attributes of the cluster, such as size or density of the cluster corresponding to a radius of the icon. In some cases, visual attributes of the cluster icons 504 may be varied according to a variety of different properties, for instance with attributes like color, line weight, drop shadow, saturation, transparency, animated vibrations, and the like corresponding to attributes like a number of nodes in the cluster, a density of the cluster, a topic addressed by unstructured text in the cluster, aggregate statistics of metadata of nodes in the cluster, and the like.

As noted, some embodiments may include node icons 506 and 508 adjacent the cluster icon 504 to which the node icons pertain. In some embodiments, two types of node icons 506 and 508 may be included. In some cases, node icons 506 correspond to nodes that are significant in virtue of metadata or unstructured text attributes of the respective node, such as according the techniques described above. In some embodiments, the node icons 508 may be significant in virtue of edge properties of the respective node, like a particularly high score of a topic of a cluster to which the cluster of that respective node connects, a number of edges connected to that node, a median number of edge weights of edges connect to that node, and the like. In some cases, the edge node icons 508 may be positioned on a line 510 connecting to clusters 504. In some cases, the edges 510 may indicate an amount of edges of nodes in connected clusters extending between the clusters, such as greater than a threshold amount. In other cases, the width or color of the lines 510 may indicate a cooccurrence of topics, a cooccurrence of keywords, cross citation, and the like. In some cases, where edge node icons arise from cooccurrence of topics or other attributes by which clusters are length, the edge node icons 508 may positioned on the line between those respective clusters.

In some cases, the node icons 506 and 508 may be positioned adjacent the respective cluster icon 504, for instance according to a force directed arrangement, such as according to a physics simulation, like those described below, in which the respective cluster icon 504 has a mass with gravity or a charge that attracts the node icons, and a physics simulation may be executed to allow the node icons to settle into a final position. In some cases, the node icons 506 and 508 in the simulation may be modeled as having a larger perimeter than that depicted to maintain some separation or as having a repellent force that engages materially in smaller distances than the force that attracts them to the respective cluster icon.

To simplify the view of FIGS. 5A and 5B, examples of the various types of icons are labeled, but it should be understood that the similar elements have similar designations.

In the illustrated graph, each of the clusters 504 may be positioned relative to one another according to a force directed layout as well. For example, the lines 510 connecting the respective clusters may be modeled according to a physics model, like according to springs, with the clusters 504 being modeled is having a repellent force, placing the springs in tension. In some cases, the springs corresponding to the lines 510 may tend to pull the clusters towards one another in the simulation, while the repellent force modeled for the respective clusters 504 may tend to push the clusters apart. In some cases, the simulation may be run to permit the clusters to settle into a relatively low energy state, and that relatively low energy state, such as less than a threshold amount or after a threshold number of iterations of modeling, may be designated as the graphical representation to be displayed to the user. In some cases, the graphical representation may be displayed as animated sequence in which the simulation is executed, and the clusters and other elements are shown in the animation transitioning between a higher energy state and a lower energy state, for instance, by translating across the field-of-view 502 into their final position.

In the illustrated embodiment, the respective icons 506, 508, and 504 are shown as circles, but embodiments are consistent with a variety of other shapes, such as squares, octagons, triangles, and the like. In some cases, the different icons may have different shapes, such as with squares designating nodes and circles dedicating clusters. In some cases, the shapes may be symmetric regular shapes, or in some embodiments, the shapes may have irregular shapes, such as a convex hull of an underlying cluster of nodes, for instance after running a force directed physics simulation of the underlying cluster.

In some embodiments, the line weight of lines 510 may indicate a strength of connection between the clusters, such as an amount of overlapping topics addressed, an amount of edges extending there between, and average weight of edges extending there between (e.g., edges of nodes in each of the two clusters connected by a line 510), and the like. In some embodiments, the lines 510 may be curved, for instance, according to a Bezier curve. In some embodiments, parameters of the Bezier curve may be also constructed according to a physics simulation, for instance with lines extending from the respective clusters generally being repelled one another to cause the respective lines to distribute around the respective cluster icon 504.

As shown in FIGS. 5A and 5B, the respective icons are unlabeled with text. Some embodiments may determine positions of that text in the field-of-view 502 based on the position of the related icon, e.g., positioning such text radially outward away from the center of the field-of-view 502 an adjacent the corresponding icon. In some cases, the text labels may indicate topics scoring relatively highly in the aggregate for respective clusters, topics scoring relatively highly for particular nodes, keywords or other n-grams having relatively high TF-IDF or BM25 scores within the respective cluster or node, or the like. In some cases, such attributes of nodes may be aggregated within the cluster to determine the text associated with the cluster, such as a measure of central tendency or by identifying outliers. Examples of such measures of central tendency include a mean, mode, and median. In some embodiments, the text labels are associated with scores indicating a significance or prominence of the respective text label, such as a score indicating an amount by which a particular topic scores particularly highly for the respective cluster or similar scores for n-grams.

In some embodiments, the graphical representation may be responsive to user inputs, such as zooming, panning, and icon selection. For instance, some embodiments may include event handlers for the respective icons, and upon a user clicking on, hovering over, touching, or otherwise selecting respective icons, some embodiments may present responsive information, such as the text of a document pertaining to the icon, various attributes of the node pertaining to the icon, aggregate attributes of the clusters, and the like.

In some embodiments, the graphical visualization 500 includes a timeline 512 in which a horizontal axis corresponds to the forward advancement of time through some range, for instance according to regular increments corresponding to horizontal pixel positions in the field-of-view 502. In some embodiments, the timeline may be augmented with a legend indicating the corresponding dates. In some embodiments, the timeline may include a histogram indicating amounts of nodes in the graphical visualization that have timestamps or dates corresponding to some duration of time, like a quantized increment, such as a day, week, or month. Some embodiments may determine for each of bin of time the corresponding amount of nodes, like a count, and render a vertical bar having a height in the graphical visualization that corresponds to that count. For example as indicated by element 514.

In some embodiments, a user may select a particular cluster, topic, or other attribute, and some embodiments may render an overlaid histogram 516 that indicates the subset of the portion of each bar that pertains to the user selection. For example, some embodiments may select a particular cluster, and the timeline may indicate the temporal trend of that clusters contribution to the overall trend of nodes corresponding to dates or times.

Thus, some embodiments may facilitate relatively quick and detailed exploration of a relatively large data set in the form of a graph, as both representative and outlier nodes may be brought to the user's attention while still providing an overarching summary of the structure of the graph.

Figure 6:
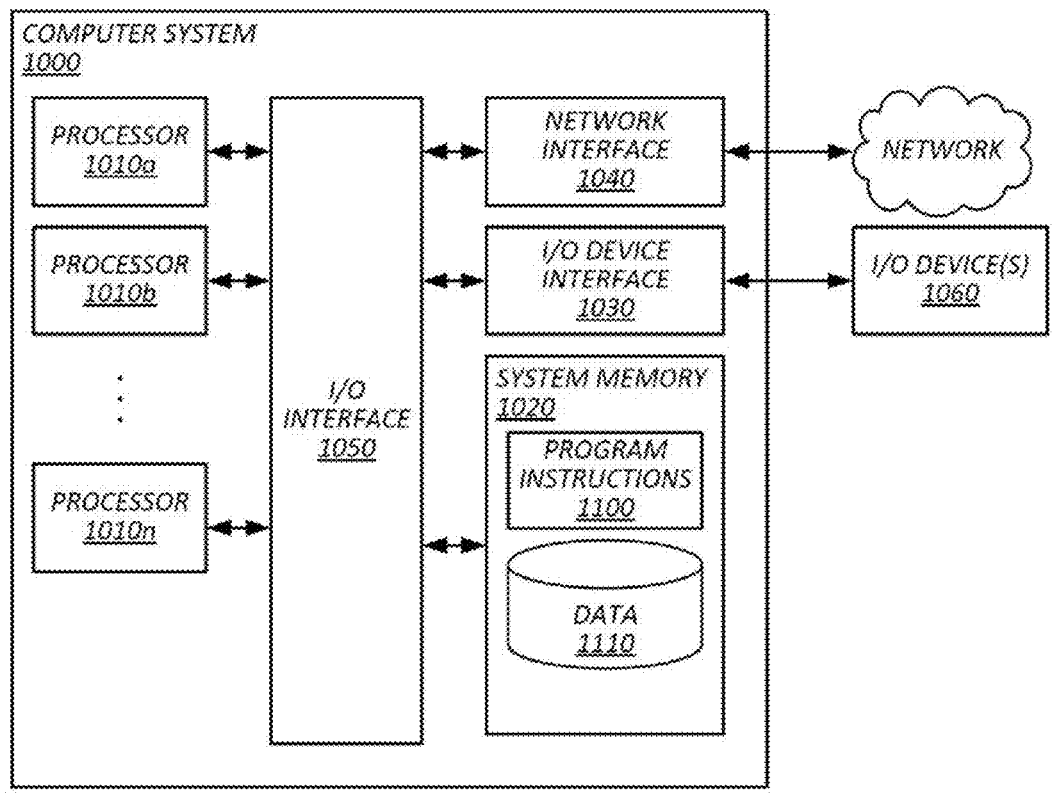
FIG. 6 illustrates an example of a computer system by which the above techniques may be implemented.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable media storing instructions that when executed by one or more computers effectuate operations comprising: obtaining a clustered graph, the clustered graph having three or more clusters, each cluster having a plurality of nodes of the graph, the nodes being connected in pairs by one or more respective edges; determining visual attributes of cluster icons based on amounts of nodes in clusters corresponding to the respective cluster icons; determining positions of the cluster icons in a graphical visualization of the clustered graph; obtaining, for each cluster, a respective subset of nodes in the respective cluster; determining visual attributes of node icons based on attributes of corresponding nodes in the subsets of nodes, each node icon representing one of the nodes in the respective subset of nodes; determining positions of the node icons in the graphical visualization based on the positions of the corresponding cluster icons of clusters having the nodes corresponding to the respective node icons; and causing the graphical visualization to be displayed.

2. The media of embodiment 1, wherein: determining visual attributes of cluster icons comprises determining sizes of the cluster icons, the different cluster icons having different sizes corresponding to amounts of nodes in the corresponding clusters; determining positions of the cluster icons comprises executing a simulation of a physical system in which objects corresponding to the cluster icons apply forces to one another and the forces depend on the distance there between in the graphical visualization; obtaining, for each cluster, a respective subset of nodes comprises selecting nodes in response to determining the selected nodes have representative or anomalous attributes among the nodes in the respective cluster; determining visual attributes of the node icons comprises determining sizes of the node icons based on the attributes that caused the node icons to be selected; and determining positions of the node icons in the graphical visualization comprises executing a simulation of a physical system in which objects representing the node icons are repelled from one another and are attracted to objects representing the corresponding cluster icons.

3. The media of any of embodiments 1-2, wherein obtaining a clustered graph comprises obtaining a semantic similarity graph of documents based on semantic similarly of unstructured text in the documents by performing operations comprising: determining a feature vector for each document, each feature vector having plurality of scores, each score corresponding to a given n-gram and being based on: an amount of occurrences of the given n-gram in the respective document, a length of the respective document, an amount of occurrences of the given n-gram in a plurality of other documents different from the respective document, and whether the given n-gram is among the set of n-grams pertaining to the selected topic; and determining an adjacency matrix based on the feature vectors, wherein rows and columns of the adjacency matrix correspond to the documents, values of the feature matrix correspond to a selected-topic-adjusted semantic similarity of documents corresponding to the respective row and column of the values, and values of the feature matrix are based on angles between feature vectors of the documents corresponding to the respective row and column of the values, the operations comprising steps for reducing movement of data across a memory hierarchy.

4. The media of any of embodiments 1-3, wherein: determining visual attributes of cluster icons comprises steps for determining visual attributes of cluster icons.

5. The media of any of embodiments 1-4, wherein: determining visual attributes of cluster icons comprises determining an area of a cluster icon based on an amount of nodes in the corresponding cluster and a result of steps for scaling a visual attribute.

6. The media of any of embodiments 1-5, wherein: determining positions of the cluster icons comprises approximating a solution to a combinatorial optimization problem in which a lower energy state is iteratively approached for a collection of bodies interacting with one another over distance with forces that are a function of pairwise distances.

7. The media of any of embodiments 1-6, wherein: obtaining, for each cluster, a respective subset of nodes in the respective cluster comprises selecting nodes based on one or more of the following node attributes: an amount of social sharing of an item represented by the node; an amount of times an item represented by the node was republished; an amount of times an item represented by the node was cited; an amount of times an item represented by the node was commented upon; a score indicating that the node bridges between topics in unstructured text represented by the nodes; user ratings or reviews of items represented by the node; and metrics of a business represented by the node.

8. The media of any of embodiments 1-7, wherein: determining visual attributes of node icons comprises determining a spatial dimension of the icon based on magnitudes of attributes of the nodes represented by the icons and normalizing the magnitudes among a plurality of nodes.

9. The media of any of embodiments 1-8, wherein: the cluster icons are circles and the node icons are circles adjacent the corresponding cluster icons.

10. The media of any of embodiments 1-9, wherein: the graphical visualization is configured to receive a user selection of a cluster icon and a request to break-up the cluster corresponding to the selected cluster icon and respond by performing operations comprising: obtaining a clustering of nodes in the selected cluster, the clustering yielding a division of the selected cluster into a plurality of new clusters; determining visual attributes and positions of new cluster icons corresponding to the plurality of clusters yielded by the division and clustering of the selected cluster; obtaining a subsets of nodes of the new clusters; and determining visual attributes and positions of new node icons corresponding to the subsets of nodes of the new clusters.

11. The media of any of embodiments 1-10, wherein: the graphical visualization is configured to receive a user selection of first and second cluster icons and respond to the selection by performing operations comprising: merging clusters corresponding to the first and second cluster icons; determining a new subset of nodes in the merged cluster based on attributes of the nodes; determining a position and a visual attribute of a new cluster icon corresponding to the merged clusters; determine positions and visual attributes of node icons corresponding to the new subset.

12. The media of embodiment 11, wherein receiving a user selection comprises: receiving a drag-and-drop even with an event handler of the graphical visualization.

13. The media of any of embodiments 1-12, wherein: visual elements of the graphical visualization link a subset of pairwise combinations of the cluster icons; and for a given cluster icon, a given node icon associated with the given cluster icon is positioned within the graphical visualization based on a position of a visual element linking the given cluster icon to another cluster icon.

14. The media of embodiment 13, wherein: the given node icon corresponds to a document including in natural language text a topic addressed in the cluster corresponding to the other cluster icon, the topic being determined with steps for determining topics of unstructured text; and the given node icon at least partially overlaps with the visual element.

15. The media of any of embodiments 1-14, wherein: the nodes are associated with respective dates; and the graphical visualization includes a histogram of a time-series of the node dates.

16. The media of embodiment 15, wherein: the graphical visualization is configured to receive a user selection of a cluster icon and respond by adjusting the histogram of the time series to include a histogram of a time series of node dates of nodes in the cluster corresponding to the selected cluster icon, such that a contribution of the selected cluster to the time-series is distinguished from contributions from nodes of un-selected clusters.

17. The media of any of embodiments 1-16, wherein: the graph contains more than 1000 nodes and more than 2000 edges; the clustered graph contains more than 10 clusters; the subsets of nodes are less than 20 for each cluster.

18. The media of any of embodiments 1-17, wherein: determining positions of the cluster icons comprises steps for determining positions of cluster icons; obtaining, for each cluster, a respective subset of nodes in the respective cluster comprises steps for selecting representative or anomalous nodes of a cluster; determining positions of the node icons comprises steps for determining positions of node icons; and causing the graphical visualization to be displayed comprises steps for causing graphical visualizations to be displayed.

19. The media of any of embodiments 1-18, wherein: obtaining a clustered graph comprises analyzing relationships between a plurality of entities.

20. The media of embodiment 1, wherein determining positions of the node icons in the graphical visualization comprises: obtaining attributes of the nodes corresponding to the node icons; and positioning the node icons around a corresponding cluster such that resulting positions indicate relative values of the attributes.

21. The media of embodiment 20, wherein positioning the node icons around a corresponding cluster comprises positioning the node icons at angles determined based on ages of the nodes corresponding to the node icons.

20. A method, comprising: the operations of any of embodiments 1-21.

21. A system, comprising: one or more processors; and memory storing instructions that when executed by the processors cause the processors to effectuate operations comprising: the operations of any of embodiments 1-21.

What is claimed is:

1. A tangible, non-transitory, machine-readable media storing instructions that when executed by one or more computers effectuate operations comprising:

obtaining, with one or more processors, a clustered graph, the clustered graph having three or more clusters, each cluster having a plurality of nodes of the graph, the nodes being connected in pairs by one or more respective edges, wherein obtaining the clustered graph comprises:

ingesting a corpus of documents via a network;

forming a graph of the documents, the graph having edges determined by ascertaining relationships between the documents based on unstructured natural language text in the documents; and clustering the graph with a graph processing algorithm;

determining, with one or more processors, visual attributes of cluster icons based on amounts of nodes in clusters corresponding to the respective cluster icons;

determining, with one or more processors, positions of the cluster icons in a graphical visualization of the clustered graph;

obtaining, with one or more processors, for each cluster, a respective subset of nodes in the respective cluster by selecting representative or anomalous nodes in the respective cluster;

determining, with one or more processors, visual attributes of node icons based on attributes of corresponding nodes in the subsets of nodes, each node icon representing one of the nodes in the respective subset of nodes;

determining, with one or more processors, positions of the node icons in the graphical visualization based on the positions of the corresponding cluster icons of clusters having the nodes corresponding to the respective node icons; and sending, via a network, with a server, instructions causing the graphical visualization to be displayed on display of a client computing device, wherein the graphical visualization concurrently displays:

a given cluster icon representing a given cluster among the three or more clusters; and a representative node icon representing a first document within the given cluster and determined to be representative of documents within the given cluster and having a first position on the display determined relative to a second position of the given cluster icon; or an anomalous node icon representing a second document within the given cluster and determined to be anomalous relative to a distribution of documents within the given cluster and having a third position on the display determined relative to the second position of the given cluster icon.

2. The media of claim 1, wherein:
determining visual attributes of cluster icons comprises determining sizes of the cluster icons, the different cluster icons having different sizes corresponding to amounts of nodes in the corresponding clusters;
determining positions of the cluster icons comprises executing a simulation of a physical system in which objects corresponding to the cluster icons apply forces to one another and the forces depend on the distance there between in the graphical visualization;
obtaining, for each cluster, a respective subset of nodes comprises selecting nodes in response to determining the selected nodes have representative or anomalous attributes among the nodes in the respective cluster;
determining visual attributes of the node icons comprises determining sizes of the node icons based on the attributes that caused the node icons to be selected; and
determining positions of the node icons in the graphical visualization comprises executing a simulation of a physical system in which objects representing the node icons are repelled from one another and are attracted to objects representing the corresponding cluster icons.

3. The media of claim 1, wherein obtaining a clustered graph comprises obtaining a semantic similarity graph of documents based on semantic similarly of unstructured text in the documents by performing operations comprising:
determining a feature vector for each document, each feature vector having plurality of scores, each score corresponding to a given n-gram and being based on:
an amount of occurrences of the given n-gram in the respective document,
a length of the respective document,
an amount of occurrences of the given n-gram in a plurality of other documents different from the respective document, and
whether the given n-gram is among the set of n-grams pertaining to the selected topic; and
determining an adjacency matrix based on the feature vectors, wherein rows and columns of the adjacency matrix correspond to the documents, values of the feature matrix correspond to a selected-topic-adjusted semantic similarity of documents corresponding to the respective row and column of the values, and values of the feature matrix are based on angles between feature vectors of the documents corresponding to the respective row and column of the values, the operations comprising steps for reducing movement of data across a memory hierarchy.

4. The media of claim 1, wherein:
determining visual attributes of cluster icons comprises steps for determining visual attributes of cluster icons.

5. The media of claim 1, wherein:
determining visual attributes of cluster icons comprises determining an area of a cluster icon based on an amount of nodes in the corresponding cluster and a result of steps for scaling a visual attribute.

6. The media of claim 1, wherein:
determining positions of the cluster icons comprises approximating a solution to a combinatorial optimization problem in which a lower energy state is iteratively approached for a collection of bodies interacting with one another over distance with forces that are a function of pairwise distances.

7. The media of claim 1, wherein:
obtaining, for each cluster, a respective subset of nodes in the respective cluster comprises selecting nodes based on one or more of the following node attributes:
an amount of social sharing of an item represented by the node;
an amount of times an item represented by the node was republished;
an amount of times an item represented by the node was cited;
an amount of times an item represented by the node was commented upon;
a score indicating that the node bridges between topics in unstructured text represented by the nodes;
user ratings or reviews of items represented by the node; and
metrics of a business represented by the node.

8. The media of claim 1, wherein:
determining visual attributes of node icons comprises determining a spatial dimension of the icon based on magnitudes of attributes of the nodes represented by the icons and normalizing the magnitudes among a plurality of nodes.

9. The media of claim 1, wherein:
the cluster icons are circles and the node icons are circles adjacent the corresponding cluster icons.

10. The media of claim 1, wherein:
the graphical visualization is configured to receive a user selection of a cluster icon and a request to break-up the cluster corresponding to the selected cluster icon and respond by performing operations comprising:
obtaining a clustering of nodes in the selected cluster, the clustering yielding a division of the selected cluster into a plurality of new clusters;
determining visual attributes and positions of new cluster icons corresponding to the plurality of clusters yielded by the division and clustering of the selected cluster;
obtaining a subsets of nodes of the new clusters; and
determining visual attributes and positions of new node icons corresponding to the subsets of nodes of the new clusters.

11. The media of claim 1, wherein:
the graphical visualization is configured to receive a user selection of first and second cluster icons and respond to the selection by performing operations comprising:
merging clusters corresponding to the first and second cluster icons;
determining a new subset of nodes in the merged cluster based on attributes of the nodes;
determining a position and a visual attribute of a new cluster icon corresponding to the merged clusters;
determine positions and visual attributes of node icons corresponding to the new subset.

12. The media of claim 11, wherein receiving a user selection comprises:
receiving a drag-and-drop even with an event handler of the graphical visualization.

13. The media of claim 1, wherein:
visual elements of the graphical visualization link a subset of pairwise combinations of the cluster icons; and
for a given cluster icon, a given node icon associated with the given cluster icon is positioned within the graphical visualization based on a position of a visual element linking the given cluster icon to another cluster icon.

14. The media of claim 13, wherein:
the given node icon corresponds to a document including in natural language text a topic addressed in the cluster corresponding to the other cluster icon, the topic being determined with steps for determining topics of unstructured text; and the given node icon at least partially overlaps with the visual element.

15. The media of claim 1, wherein:
the nodes are associated with respective dates; and
the graphical visualization includes a histogram of a time-series of the node dates.

16. The media of claim 15, wherein:
the graphical visualization is configured to receive a user selection of a cluster icon and respond by adjusting the histogram of the time series to include a histogram of a time series of node dates of nodes in the cluster corresponding to the selected cluster icon, such that a contribution of the selected cluster to the time-series is distinguished from contributions from nodes of un-selected clusters.

17. The media of claim 1, wherein:
the graph contains more than 1000 nodes and more than 2000 edges;
the clustered graph contains more than 10 clusters;
the subsets of nodes are less than 20 for each cluster.

18. The media of claim 1, wherein:
determining positions of the cluster icons comprises steps for determining positions of cluster icons;
obtaining, for each cluster, a respective subset of nodes in the respective cluster comprises steps for selecting representative or anomalous nodes of a cluster;
determining positions of the node icons comprises steps for determining positions of node icons; and
causing the graphical visualization to be displayed comprises steps for causing graphical visualizations to be displayed.

19. The media of claim 1, wherein:
obtaining a clustered graph comprises analyzing relationships between a plurality of entities.

20. The media of claim 1, wherein determining positions of the node icons in the graphical visualization comprises:
obtaining attributes of the nodes corresponding to the node icons; and
positioning the node icons around a corresponding cluster such that resulting positions indicate relative values of the attributes.

21. The media of claim 20, wherein positioning the node icons around a corresponding cluster comprises positioning the node icons at angles determined based on ages of the nodes corresponding to the node icons.

22. A method, comprising:
obtaining, with one or more processors, a clustered graph, the clustered graph having three or more clusters, each cluster having a plurality of nodes of the graph, the nodes being connected in pairs by one or more respective edges, wherein obtaining the clustered graph comprises:
ingesting a corpus of documents via a network;
forming a graph of the documents, the graph having edges determined by ascertaining relationships between the documents based on unstructured natural language text in the documents; and
clustering the graph with a graph processing algorithm;
determining, with one or more processors, visual attributes of cluster icons based on amounts of nodes in clusters corresponding to the respective cluster icons;
determining, with one or more processors, positions of the cluster icons in a graphical visualization of the clustered graph;

obtaining, with one or more processors, for each cluster, a respective subset of nodes in the respective cluster;
determining, with one or more processors, visual attributes of node icons based on attributes of corresponding nodes in the subsets of nodes, each node icon representing one of the nodes in the respective subset of nodes;
determining, with one or more processors, positions of the node icons in the graphical visualization based on the positions of the corresponding cluster icons of clusters having the nodes corresponding to the respective node icons; and
sending, via a network, with a server, instructions causing the graphical visualization to be displayed on display of a client computing device, wherein the graphical visualization concurrently displays:
a given cluster icon representing a given cluster among the three or more clusters; and
a representative node icon representing a first document within the given cluster and determined to be representative of documents within the given cluster and having a first position on the display determined relative to a second position of the given cluster icon; or
an anomalous node icon representing a second document within the given cluster and determined to be anomalous relative to a distribution of documents within the given cluster and having a third position on the display determined relative to the second position of the given cluster icon.

23. The method of claim 1, wherein clustering the graph with a graph processing algorithm comprises:
randomly traversing the graph by choosing edges with probabilities based on respective edge weights of the respective edges;
forming a transition probability matrix based on the traversing, the transition probability matrix indicating a probability of traveling from one node to another node in the graph;
normalizing the transition probability matrix;
iteratively expanding and inflating the matrix until the matrix converges; and
ascertaining clusters according to positive values along rows of the converged matrix.

24. The method of claim 1, the operations comprising, for the given cluster:
identifying a high-side anomalous document by determining the high-side anomalous document is an outlier on a high side of a distribution of attributes values;
identifying a low-side anomalous document by determining the low-side anomalous document is an outlier on a low side of a distribution of attributes values; and
instructing the client computing device, via the network, to graphically represent low-side anomalous document and the high-side anomalous document differently in the user interface.

25. The method of claim 1, wherein:
selecting representative or anomalous nodes in the respective cluster comprises selecting representative nodes in the respective cluster and selecting anomalous nodes in the respective cluster; and
the sent instructions cause the client computing device to display both the representative node icon in spaced relation to the given cluster icon in the user interface and the anomalous node icon in spaced relation to the given cluster icon in the user interface.

26. The method of claim 1, wherein:

selecting representative or anomalous nodes in the respective cluster comprises selecting representative or anomalous nodes based on an interaction between two or more attributes of a respective node.

27. The method of claim 1, wherein:

selecting representative or anomalous nodes in the respective cluster comprises, for each node in the given cluster, forming a respective attribute vector having a plurality of dimensions; and for the nodes in the given cluster, executing a density based clustering algorithm on the attribute vectors of the nodes in the given cluster and determining which nodes in the given cluster are designated as outlier nodes by the density based clustering algorithm.

\* \* \* \* \*